(12) United States Patent
Chae et al.

(10) Patent No.: US 11,462,146 B2
(45) Date of Patent: Oct. 4, 2022

(54) GAMMA VOLTAGE GENERATION CIRCUIT AND DISPLAY DEVICE INCLUDING THE SAME

(71) Applicant: SAMSUNG DISPLAY CO., LTD., Yongin-si (KR)

(72) Inventors: Se Byung Chae, Yongin-si (KR); Su Bin Kim, Yongin-si (KR); Jin Young Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/519,921

(22) Filed: Nov. 5, 2021

(65) Prior Publication Data
US 2022/0223091 A1 Jul. 14, 2022

(30) Foreign Application Priority Data
Jan. 8, 2021 (KR) .......................... 10-2021-0002883

(51) Int. Cl.
*G09G 3/20* (2006.01)
*G09G 3/32* (2016.01)

(52) U.S. Cl.
CPC ............. *G09G 3/2007* (2013.01); *G09G 3/32* (2013.01); *G09G 2310/027* (2013.01); *G09G 2310/0291* (2013.01); *G09G 2310/0297* (2013.01); *G09G 2310/08* (2013.01); *G09G 2320/0673* (2013.01)

(58) Field of Classification Search
CPC .. G09G 3/2007; G09G 3/32; G09G 2310/027; G09G 2310/0291; G09G 2310/0297; G09G 2310/08; G09G 2320/0673
See application file for complete search history.

(56) References Cited

U.S. PATENT DOCUMENTS

| 9,646,560 B2 | 5/2017 | Kim et al. |
| 9,761,178 B2 | 9/2017 | Park et al. |
| 2005/0259185 A1 | 11/2005 | Kim et al. |
| 2013/0271505 A1* | 10/2013 | Min ..................... G09G 3/3233 345/77 |

(Continued)

FOREIGN PATENT DOCUMENTS

| KR | 100579883 B1 | 5/2006 |
| KR | 1020160050166 A | 5/2016 |
| KR | 102171259 B1 | 10/2020 |

*Primary Examiner* — Andrew Sasinowski
(74) *Attorney, Agent, or Firm* — Cantor Colburn LLP

(57) ABSTRACT

A display device includes a display unit including a pixel which displays an image based on a first power voltage and a data signal, a gamma voltage generator which generates gamma voltages, and a data driver which generates the signal using the gamma voltages and provides the data signal to the pixel. The gamma voltage generator generates first and second reference voltages, generates first and second corrected reference voltages by correcting the first and second reference voltages using a target voltage and an external power voltage provided from the display unit in correspondence with the first power voltage, and generates the gamma voltages by dividing the first and second corrected reference voltages. The gamma voltage generator sets the target voltage based on at least one selected from the first reference voltage, the second reference voltage, and a ground voltage.

26 Claims, 12 Drawing Sheets

(56) References Cited

U.S. PATENT DOCUMENTS

| | | | |
|---|---|---|---|
| 2015/0317937 A1* | 11/2015 | Zhu | G09G 3/3614 |
| | | | 345/89 |
| 2017/0053596 A1* | 2/2017 | Hyun | G09G 3/2003 |
| 2017/0263185 A1* | 9/2017 | Nakagawa | H01L 51/50 |
| 2020/0020268 A1* | 1/2020 | Kim | G09G 3/3208 |

* cited by examiner

GAMMA VOLTAGE GENERATION CIRCUIT AND DISPLAY DEVICE INCLUDING THE SAME

This application claims priority to Korean Patent Application No. 10-2021-0002883, filed on Jan. 8, 2021, and all the benefits accruing therefrom under 35 U.S.C. § 119, the content of which in its entirety is herein incorporated by reference.

BACKGROUND

1. Field

An embodiment of the disclosure relates to a gamma voltage generation circuit and a display device including the gamma voltage generation circuit.

2. Description of the Related Art

A display device typically includes a display panel and a driver. The display panel may include scan lines, data lines, and pixels. The driver may include a scan driver that sequentially provides scan signals to the scan lines and a data driver that provides data signals to the data lines. Each of the pixels may emit light at a luminance corresponding to a data signal provided thereto through a corresponding data line in response to a scan signal provided thereto through a corresponding scan line.

A gamma voltage generation circuit may generate gamma voltages corresponding to a plurality of grayscales, and the data driver may convert a grayscale value of image data into a data signal using the gamma voltages.

SUMMARY

A power voltage for driving pixels may be provided in a display device. When the power voltage is changed (or fluctuated) due to various reasons such as voltage drop and noise, a driving current flowing through the pixels may change, and the pixels may not emit light at a desired luminance.

An embodiment of the disclosure provides a gamma voltage generation circuit capable of compensating for a change (or a change amount) of a power voltage, and a display device including the gamma voltage generation circuit.

In an embodiment of the disclosure, a display device includes a display unit including a pixel which displays an image based on a first power voltage and a data signal, a gamma voltage generator which generates a plurality of gamma voltages, and a data driver which generates the data signal using the gamma voltages and which provides the data signal to the pixel. In such an embodiment, the gamma voltage generator generates a first reference voltage and a second reference voltage, generates a first corrected reference voltage and a second corrected reference voltage by correcting the first reference voltage and the second reference voltage using a target voltage and an external power voltage provided from the display unit in correspondence with the first power voltage, and generates the gamma voltages by dividing the first corrected reference voltage and the second corrected reference voltage. In such an embodiment, the gamma voltage generator sets the target voltage based on at least one selected from the first reference voltage, the second reference voltage, and a ground voltage.

According to an embodiment, the gamma voltage generator may include a first reference voltage corrector which generates a first target voltage by dividing the first reference voltage and the ground voltage and which generates the first corrected reference voltage by correcting the first reference voltage in proportion to a voltage difference between the first target voltage and the external power voltage.

According to an embodiment, the first reference voltage corrector may include a first resistor string which divides a voltage between the first reference voltage and the ground voltage using a plurality of resistors therein to generate a plurality of voltages, and a first decoder which selects and outputs one of the voltages generated by the first resistor string as the first target voltage.

According to an embodiment, the first reference voltage corrector may further include a first amplifier which outputs the first corrected reference voltage through an output terminal thereof, a first resistor connected between the external power voltage and a first input terminal of the first amplifier, a second resistor connected between the first reference voltage and the first input terminal of the first amplifier, a third resistor connected between an output terminal of the first decoder and a second input terminal of the first amplifier, and a fourth resistor connected between the second input terminal of the first amplifier and the output terminal of the first amplifier.

According to an embodiment, the gamma voltage generator may further include a second reference voltage corrector which generates a second target voltage by dividing the second reference voltage and the ground voltage and generates the second corrected reference voltage by adding the second target voltage to a voltage difference between the external power voltage and the second reference voltage.

According to an embodiment, the second reference voltage corrector may include a second resistor string which divides a voltage between the second reference voltage and the ground voltage using a plurality of resistors therein to generate a plurality of voltages, and a second decoder which selects and outputs one of the voltages generated by the second resistor string as the second target voltage.

According to an embodiment, the second reference voltage corrector may further include a second amplifier which outputs the second corrected reference voltage through an output terminal thereof, a fifth resistor connected between the external power voltage and a first input terminal of the second amplifier, a sixth resistor connected between an output terminal of the second decoder and the first input terminal of the second amplifier, a seventh resistor connected between the second reference voltage and a second input terminal of the second amplifier, and an eighth resistor connected between the second input terminal of the second amplifier and the output terminal of the second amplifier.

According to an embodiment, the gamma voltage generator may include a first reference voltage corrector which sets the ground voltage as a first target voltage and which generates the first corrected reference voltage by correcting the first reference voltage in proportion to a voltage difference between the first target voltage and the external power voltage.

According to an embodiment, the gamma voltage generator may include a first reference voltage corrector which generates a first target voltage by dividing the first reference voltage and the ground voltage and generates the first corrected reference voltage by correcting the first reference voltage in proportion to a voltage difference between the external power voltage and a selected one of the first target voltage, a third reference voltage and the ground voltage, and the third reference voltage may be generated together with the first reference voltage and the second reference voltage, and may have a voltage level lower than a voltage level of the first reference voltage and higher than a voltage level of the second reference voltage.

According to an embodiment, the first reference voltage corrector may further include a multiplexer which selects and outputs one of the first target voltage, the third reference voltage, and the ground voltage based on a first selection signal.

According to an embodiment, the first reference voltage corrector may further include a first amplifier which outputs the first corrected reference voltage through an output terminal thereof, a first resistor connected between the external power voltage and a first input terminal of the first amplifier, a second resistor connected between the first reference voltage and the first input terminal of the first amplifier, a third resistor connected between an output terminal of the multiplexer and a second input terminal of the first amplifier, and a fourth resistor connected between the second input terminal of the first amplifier and the output terminal of the first amplifier.

According to an embodiment, the first reference voltage corrector may further include a first resistor string which divides a voltage between the first reference voltage and the ground voltage using a plurality of resistors therein to generate a plurality of voltages, and a first decoder which selects and outputs one of the voltages generated by the first resistor string as the first target voltage.

According to an embodiment, the gamma voltage generator may further include a second resistor string which divides a voltage between the second reference voltage and the ground voltage using a plurality of resistors therein to generate a plurality of voltages, and a second decoder which selects and outputs one of the voltages generated by the second resistor string as the second target voltage, and the multiplexer may select and output one of the first target voltage, the second target voltage, the third reference voltage, and the ground voltage based on the first selection signal.

According to an embodiment, the gamma voltage generator may include a second reference voltage corrector which generates a second target voltage by dividing the second reference voltage and the ground voltage and generates the second corrected reference voltage by correcting the second reference voltage using the external power voltage and a selected one of the second target voltage and a third reference voltage, and the third reference voltage may be generated together with the first reference voltage and the second reference voltage, and may have a voltage level lower than a voltage level of the first reference voltage and higher than a voltage level of the second reference voltage.

According to an embodiment, the second reference voltage corrector may include a first multiplexer which selects and outputs one of the second reference voltage and the second target voltage based on a second selection signal, and a second multiplexer which selects and outputs one of the third reference voltage and the second reference voltage based on the second selection signal.

According to an embodiment, the second reference voltage corrector may further include a second amplifier which outputs the second corrected reference voltage through an output terminal thereof, a fifth resistor connected between the external power voltage and a first input terminal of the second amplifier, a sixth resistor connected between an output terminal of the first multiplexer and the first input terminal of the second amplifier, a seventh resistor connected between an output terminal of the second multiplexer and a second input terminal of the second amplifier, and an eighth resistor connected between the second input terminal of the second amplifier and the output terminal of the second amplifier.

According to an embodiment, the second reference voltage corrector may further include a second resistor string which divides a voltage between the second reference voltage and the ground voltage using a plurality of resistors therein to generate a plurality of voltages, and a second decoder which selects and outputs one of the voltages generated by the second resistor string as the second target voltage.

According to an embodiment, the gamma voltage generator may further include a first resistor string which divides a voltage between the first reference voltage and the ground voltage using a plurality of resistors therein to generate a plurality of voltages, and a first decoder which selects and outputs one of the voltages generated by the first resistor string as the first target voltage, the second selection signal may include a first sub selection signal and a second sub selection signal, the first multiplexer may select and output one of the second reference voltage, the first target voltage, and the second target voltage based on the first sub selection signal, and the second multiplexer may select and output one of the third reference voltage and the second reference voltage based on the second sub selection signal.

In an embodiment of the disclosure, a gamma generation circuit includes a reference voltage generator which generates a first reference voltage and a second reference voltage based on a source voltage, a first reference voltage corrector which generates a first corrected reference voltage by correcting the first reference voltage using a first target voltage and an external power voltage provided from an outside in correspondence with the first target voltage, a second reference voltage corrector which generates a second corrected reference voltage by correcting the second reference voltage using a second target voltage and the external power voltage, and a gamma voltage output unit which generates a plurality of gamma voltages by dividing the first and second corrected reference voltages. In such an embodiment, the first reference voltage corrector sets the first target voltage based on at least one selected from the first reference voltage and a ground voltage.

According to an embodiment, the first reference voltage corrector may generate the first target voltage by dividing the first reference voltage and the ground voltage, and generate the first corrected reference voltage by correcting the first reference voltage in proportion to a voltage difference between the first target voltage and the external power voltage.

According to an embodiment, the second reference voltage corrector may generate the second target voltage by dividing the second reference voltage and the ground voltage, and generate the second corrected reference voltage by adding the second target voltage to a voltage difference between the external power voltage and the second reference voltage.

According to an embodiment, the first reference voltage corrector may set the ground voltage as a first target voltage, and generate the first corrected reference voltage by correcting the first reference voltage in proportion to a voltage difference between the first target voltage and the external power voltage.

According to an embodiment, the reference voltage generator may further generate a third reference voltage, and the first reference voltage corrector may generate the first target voltage by dividing the first reference voltage and the ground voltage, and generate the first corrected reference voltage by correcting the first reference voltage in proportion to a voltage difference between the external power voltage and a selected one of the first target voltage, the third reference voltage, and the ground voltage.

According to an embodiment, the first reference voltage corrector may generate the first corrected reference voltage by correcting the first reference voltage in proportion to a voltage difference between the external power voltage and a selected one of the first target voltage, the second target voltage, the third reference voltage, and the ground voltage.

According to an embodiment, the reference voltage generator may further generate a third reference voltage, and the second reference voltage corrector may generate the second target voltage by dividing the second reference voltage and the ground voltage, and generate the second corrected reference voltage by correcting the second reference voltage using the external power voltage and a selected one of the second target voltage and the third reference voltage.

According to an embodiment, the second reference voltage corrector may generate the second corrected reference voltage by correcting the second reference voltage using the external power voltage and a selected one of the first target voltage, the second target voltage, and the third reference voltage.

In embodiments of the invention, the gamma voltage generation circuit and the display device including the gamma voltage generation circuit may correct the first and second reference voltages in association with the external power voltage provided or measured by the display unit in correspondence with the power voltage, and generate the gamma voltages based on the first and second corrected reference voltages. In such embodiments, a data driver may generate a data signal based on the gamma voltages reflecting a change of the power voltage, and a change amount of the power voltage may be corrected by the gamma voltages based on a pixel. Therefore, reduction of display quality due to the change of the power voltage may be prevented.

In such embodiments, the gamma voltage generation circuit and the display device may set a target voltage using at least one selected from the first reference voltage, the second reference voltage, and the ground voltage instead of independently setting the target voltage, which is a reference for calculating the change amount of the power voltage, to the first reference voltage and the second reference voltage. Therefore, noise generated in a process of generating and correcting the first reference voltage and the second reference voltage may be canceled by the target voltage having similar noise, and reduction of display quality may be prevented.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
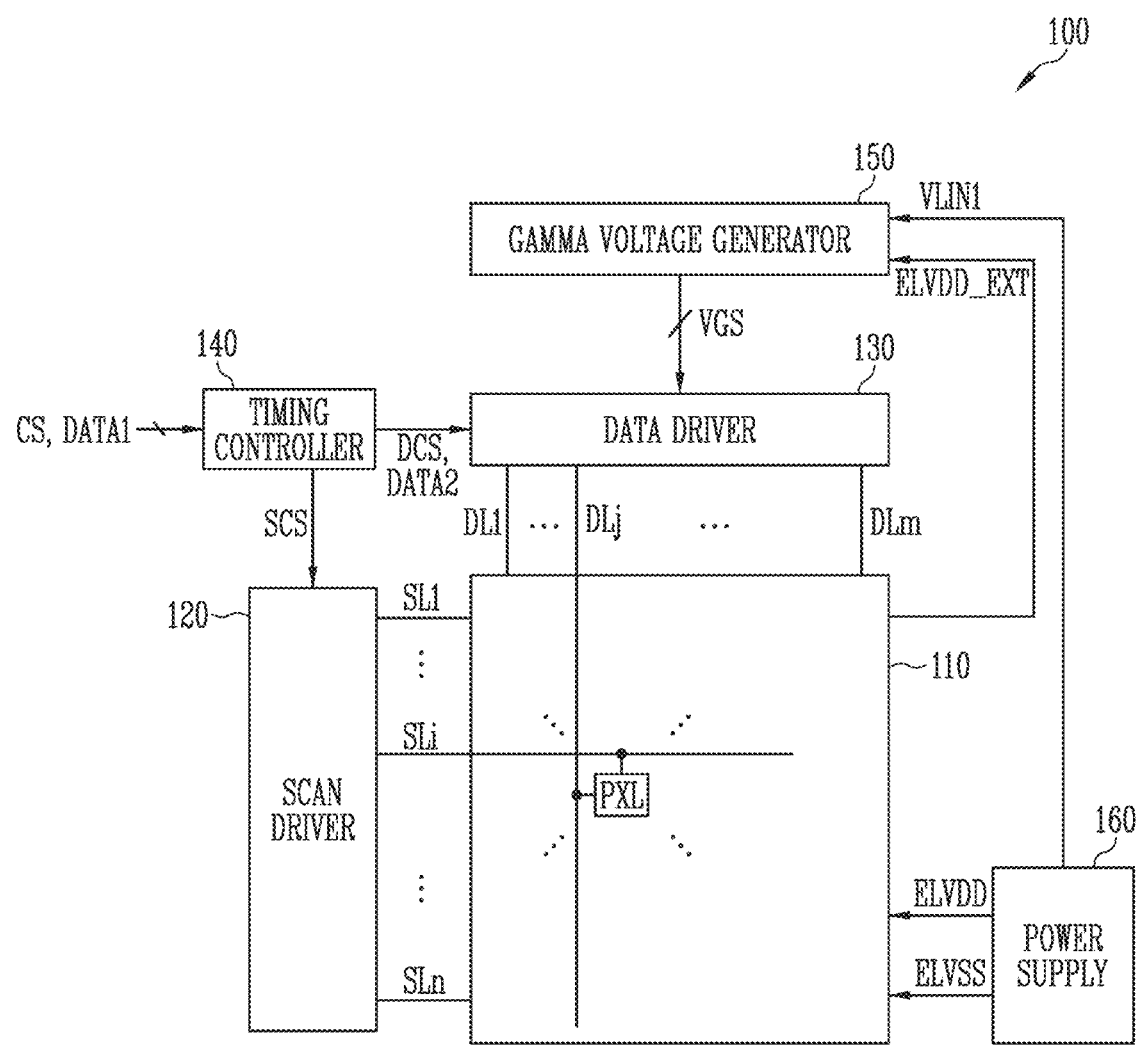
FIG. 1 is a block diagram illustrating a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the invention. Further, the blocks, units, and/or modules of some exemplary embodiments may be physically combined into more complex blocks, units, and/or modules without departing from the scope of the invention.

Meanwhile, in the drawings, some components which are not directly related to a characteristic of the disclosure may be omitted to clearly represent the disclosure. In addition, some components in the drawings may be shown to be exaggerated in size or proportion. Throughout the drawings, the same or similar components will be denoted by the same reference numerals and symbols as much as possible even though they are shown in different drawings, and repetitive description will be omitted.

Hereinafter, embodiments of the invention will be described in detail with reference to the accompanying drawings.

FIG. 1 is a block diagram illustrating a display device according to embodiments of the disclosure.

Referring to FIG. 1, an embodiment of the display device 100 may include a display unit 110 (or a display panel), a scan driver 120 (or a gate driver), a data driver 130 (or a source driver), a timing controller 140, a gamma voltage generator 150 (or a gamma voltage generation circuit), and a power supply 160.

The display unit 110 may display an image. The display unit 110 may include scan lines SL1 to SLn (where, n is a positive integer) (or gate lines), data lines DL1 to DLm (where, m is a positive integer), and pixels PXL. In one embodiment, for example, each pixel PXL may be disposed in an area (for example, a pixel area) defined or partitioned by the scan lines SL1 to SLn and the data lines DL1 to DLm.

Each pixel PXL may be connected to a corresponding one of the scan lines SL1 to SLn and a corresponding one of the data lines DL1 to DLm. In one embodiment, for example, a pixel PXL positioned in a i-th row and a j-th row may be connected to an i-th scan line SLi and a j-th data line DLj (where, each of i and j is a positive integer). However, the pixel PXL is not limited thereto, and alternatively, for example, the pixel PXL may be electrically connected to scan lines corresponding to adjacent rows (for example, a scan line corresponding to a previous row of a row including the pixel PXL, and a scan line corresponding to a subsequent row of the row including the pixel PXL). In an embodiment, the pixel PXL may be electrically connected between a first power line to which a first power voltage ELVDD is applied and a second power line to which the second power voltage ELVSS is applied. In such an embodiment, the first and second power voltages ELVDD and ELVSS may be driving voltages used for an operation of the pixel PXL, and the first power voltage ELVDD may have a voltage level higher than a voltage level of the second power voltage ELVSS. The first and second power voltages ELVDD and ELVSS may be provided from the power supply 160 to the display unit 110.

The pixel PXL may store or write a data signal (or a data voltage) provided thereto through the j-th data line DLj in response to a scan signal provided thereto through the i-th scan line SLi, and may emit light at a luminance corresponding to the stored data signal. A detailed configuration of the pixel PXL will be described later with reference to FIG. 2.

The first and second power voltages ELVDD and ELVSS may be provided to the display unit 110.

The scan driver 120 may generate the scan signal based on a scan control signal SCS and sequentially provide the scan signal to the scan lines SL1 to SLn. In an embodiment, the scan control signal SCS may include a start signal, clock signals, and the like, and may be provided from the timing controller 140 to the scan driver 120. In one embodiment, for example, the scan driver 120 may include a shift register that sequentially generates and outputs the scan signal of a pulse type by sequentially shifting the start signal of a pulse type using the clock signals.

The data driver 130 may generate the data signals (or data voltages) based on image data DATA2 and a data control signal DCS provided from the timing controller 140, and provide the data signals to the display unit 110 (or the pixel PXL). In an embodiment, the data control signal DCS may be a signal that controls an operation of the data driver 130, and may include a load signal (or a data enable signal), a horizontal start signal, a data clock signal, and the like instructing an output of a valid data signal.

The data driver 130 may select one gamma voltage (or grayscale voltage) among gamma voltages VGS (or grayscale voltages) corresponding to a grayscale value (or a data value) in the image data DATA2, and output the selected one gamma voltage as the data signal. Here, the gamma voltages VGS may be provided from the gamma voltage generator 150 to the data driver 130.

In one embodiment, for example, the data driver 130 may include a shift register that generates a sampling signal by shifting the horizontal signal in synchronization with the data clock signal, a latch that latches the image data DATA2 in response to the sampling signal, a digital-to-analog converter (or a decoder) that converts latched image data (for example, digital data) into analog data signals using the gamma voltages VGS, and buffers (or amplifiers) that output the data signals to the data lines DL1 to DLm.

The timing controller 140 may receive input image data DATA1 and a control signal CS from an external device (for example, a graphic processor), generate the scan control signal SCS and the data control signal DCS based on the control signal CS, and generate the image data DATA2 by converting the input image data DATA1. In an embodiment, the control signal CS may include a vertical synchronization signal, a horizontal synchronization signal, a reference clock signal, and the like. The vertical synchronization signal may indicate a start of frame data (that is, data corresponding to a frame period in which one frame image is displayed), and the horizontal synchronization signal may indicate a start of a data row (that is, one of a plurality of data rows included in the frame data). In one embodiment, for example, the timing controller 140 may convert the input image data DATA1 of an RGB format into the image data DATA2 of an RGBG format corresponding to a pixel arrangement in the display unit 110.

The gamma voltage generator 150 may generate the gamma voltages VGS. In one embodiment, for example, the gamma voltage generator 150 may generate a first reference voltage and a second reference voltage using a first source voltage VLIN1, and generate the gamma voltages VGS by dividing the first and second reference voltages by using a resistor string. In an embodiment, the first source voltage VLIN1 may be provided from the power supply 160. In one embodiment, for example, the first source voltage VLIN1 may have the same voltage level as the first power voltage ELVDD provided to the display unit 110, but is not limited thereto. In one embodiment, for example, the first source voltage VLIN1 may be provided from the data driver 130 or may have a voltage level different from that of the first power voltage ELVDD.

In an embodiment, the gamma voltage generator 150 may generate the gamma voltages VGS based on an external power voltage ELVDD_EXT. In an embodiment, the external power voltage ELVDD_EXT may be provided from the display unit 110 and may be a value obtained by measuring the first power voltage ELVDD supplied to the display unit 110. In one embodiment, for example, the external power voltage ELVDD_EXT may be provided to the gamma voltage generator 150 through a wire connected to another side of the display unit 110.

Detailed configuration and operation of the gamma voltage generator 150 will be described later with reference to FIG. 3.

The power supply 160 may supply the first power voltage ELVDD and the second power voltage ELVSS to the display unit 110. In addition, the power supply 160 may supply the first source voltage VLIN1 to the gamma voltage generator 150. The power supply 160 may be implemented as a power management integrated circuit ("PMIC"). The first power voltage ELVDD may be provided to one side of the display unit 110. The first power voltage ELVDD provided to the one side of the display unit 110 may have a value lower than that of the one side in an area adjacent to the other side opposite to the one side of the display unit 110, due to a resistance of an internal wire of the display unit 110 and a capacitance generated between the wires.

At least one selected from the scan driver 120, the data driver 130, the timing controller 140, and the gamma voltage generator 150 may be disposed or formed on the display unit 110, or may be implemented as an integrated circuit and may be connected to the display unit 110 in a tape carrier package type. In an embodiment, at least two selected from the scan driver 120, the data driver 130, the timing controller 140, and the gamma voltage generator 150 may be implemented as a single integrated circuit. In one embodiment, for example, the gamma voltage generator 150 may be included in the data driver 130, or the gamma voltage generator 150 and the data driver 130 may be implemented as a single integrated circuit. As another example, the data driver 130 and the timing controller 140 may be implemented as a single integrated circuit.

Figure 2:
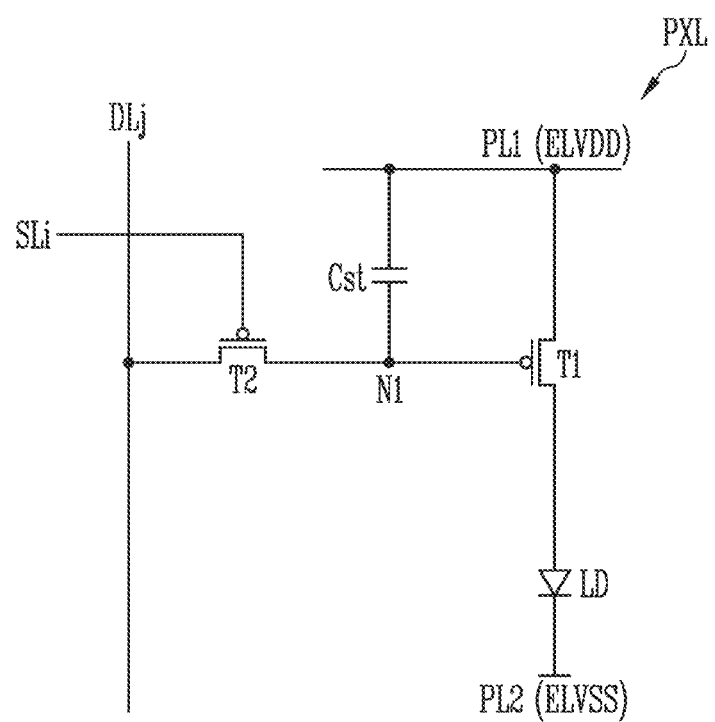
FIG. 2 is a circuit diagram illustrating an embodiment of a pixel included in the display device of FIG. 1.

FIG. 2 is a circuit diagram illustrating an embodiment of the pixel included in the display device of FIG. 1.

Referring to FIGS. 1 and 2, an embodiment of the pixel PXL may be connected to the i-th scan line SLi and the j-th data line DLj.

The pixel PXL may include a light emitting element LD, first and second transistors T1 and T2, and a storage capacitor Cst.

A first electrode (for example, an anode electrode) of the light emitting element LD may be connected to the first power line PL1 via the first transistor T1, and a second electrode (for example, a cathode electrode) of the light emitting element LD may be connected to the second power line PL2. The first power voltage ELVDD may be applied to the first power line PL1, and the second power voltage ELVSS may be applied to the second power line PL2. The light emitting element LD may include an organic light emitting diode, or may be configured of an inorganic light emitting diode such as a micro light emitting diode ("LED") or a quantum dot LED. In an embodiment, the light emitting element may be a light emitting diode including organic and inorganic materials.

A first electrode of the first transistor T1 (or a driving transistor) may be connected to the first power line PL1, and a second electrode may be connected to the first electrode of the light emitting element DL. A gate electrode of the first transistor T1 may be connected to a first node N1. The first transistor T1 may control an amount of a driving current supplied to the light emitting element LD in correspondence with a voltage of the first node N1.

A first electrode of the second transistor T2 (or a switching transistor) may be connected to the j-th data line DLj, and a second electrode may be connected to the first node N1. A gate electrode of the second transistor T2 may be connected to the i-th scan line SLi.

The storage capacitor Cst may be formed or connected between the first node N1 and the first power line PL1. In one embodiment, for example, one electrode of the storage capacitor Cst may be connected to the first node N1, and the other electrode of the storage capacitor Cst may be connected to the first power line PL1. The storage capacitor Cst may be charged with a voltage corresponding to a data signal of one frame supplied to the first node N1, and may maintain the charged voltage until a data signal of a next frame is supplied.

When a scan signal of a turn-on level (low level) is supplied to the gate electrode of the second transistor T2 through the i-th scan line SLi, the second transistor T2 may connect the j-th data line DLj and the one electrode of the storage capacitor Cst. Accordingly, a voltage corresponding to a difference between the data signal (or the data voltage) applied through the j-th data line DLj and the first power voltage ELVDD may be written to the storage capacitor Cst. In an embodiment, the data signal may correspond to a selected one of the gamma voltages VGS.

The first transistor T1 may allow a driving current determined according to the voltage written to the storage capacitor Cst to flow from the first power line PL1 to the second power line PL2. The light emitting element LD may emit light at a luminance corresponding to an amount of the driving current.

For convenience of description, FIG. 2 shows an embodiment of a pixel circuit having a relatively simple structure including the second transistor T2 for transferring the data signal into the pixel PXij, the storage capacitor Cst for storing the data signal, and the first transistor T1 for supplying the driving current corresponding to the data signal to the light emitting element LD.

However, the disclosure is not limited thereto, and the structure of the pixel circuit may be variously changed or modified. In one alternative embodiment, for example, the pixel circuit may further include various transistors such as a compensation transistor for compensating for a threshold voltage of the first transistor T1, an initialization transistor for initializing the first node N1 or the anode electrode of the light emitting element LD, and/or a light emission control transistor for controlling a light emission time of the light emitting element LD.

In an embodiment, as shown in in FIG. 2, the first and second transistors T1 and T2 are P-type transistors, but are not limited thereto, and in one alternative embodiment, for example, the pixel PXL may include an N-type transistor.

Figure 3:
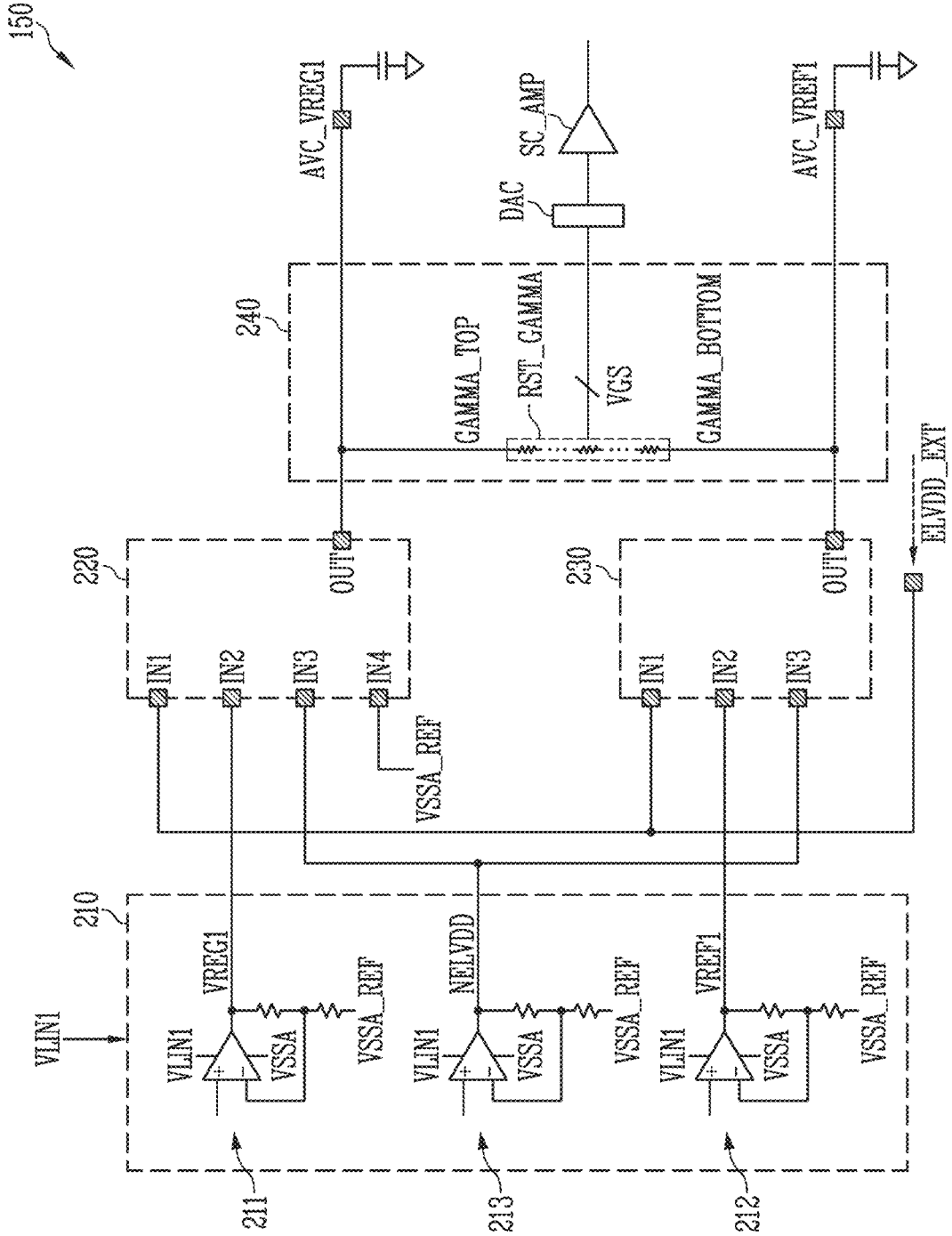
FIG. 3 is a diagram illustrating an embodiment of a gamma voltage generator included in the display device of FIG. 1.

FIG. 3 is a diagram illustrating an embodiment of the gamma voltage generator included in the display device of FIG. 1.

Referring to FIG. 3, an embodiment of the gamma voltage generator 150 may include a reference voltage generator 210, a reference voltage corrector, and a gamma voltage output unit 240.

In an embodiment, the reference voltage generator 210 may generate and output a first reference voltage VREG1 and a second reference voltage VREF1 based on the first source voltage VLIN1. In such an embodiment, a voltage level of the first reference voltage VREG1 may be higher than a voltage level of the first power voltage ELVDD, and a voltage level of the second reference voltage VREF1 may be lower than a voltage level of the second power voltage ELVSS. In one embodiment, for example, the voltage level of the first reference voltage VREG1 may be about 5.7 volts (V), and the voltage level of the second reference voltage VREF1 may be about 0.5 V. However, the disclosure is not limited thereto. In one alternative embodiment, for example, the voltage level of the first reference voltage VREG1 may be lower than the voltage level of the first power voltage ELVDD.

In an embodiment, the reference voltage generator 210 may output a third reference voltage NELVDD (or a reference target voltage). The third reference voltage NELVDD may correspond to the first power voltage ELVDD. In one embodiment, for example, the third reference voltage NELVDD may be a target voltage of the first power voltage ELVDD, that is, a target voltage of the first power voltage ELVDD for normally driving the pixel PXL of the display unit 110. A voltage level of the third reference voltage NELVDD may be lower than the voltage level of the first reference voltage VREG1 and higher than the voltage level of the second reference voltage VREF1. In one embodiment, for example, the voltage level of the third reference voltage NELVDD may be about 2.8 V.

The voltage level of each of the first reference voltage VREG1, the second reference voltage VREF1, and the third reference voltage NELVDD may be determined in advance through a gamma voltage setting process performed during a product production. In the gamma voltage setting process, the display device 100 may be connected to a separate test device other than the power supply 160, and may receive a test power voltage (for example, the first power voltage ELVDD) from the test device. The voltage levels of each of the first reference voltage VREG1, the second reference voltage VREF1, and the third reference voltage NELVDD may be set in correspondence with the test power voltage.

In an embodiment, the reference voltage generator 210 may include a first reference voltage generation circuit 211 that outputs the first reference voltage VREG1, a second reference voltage generation circuit 212 that outputs the second reference voltage VREF1, and a third reference voltage generation circuit 213 (or a target voltage generation circuit) that outputs the third reference voltage NELVDD. According to an alternative embodiment, the third reference voltage generation circuit 213 may be omitted.

In an embodiment, the reference voltage generator 210 may output a plurality of divided voltages using a resistor string connected between the first source voltage VLIN1 (or a first source, a line to which the first source voltage VLIN1 is applied) and a second source voltage VSSA_REF (or a second source, a line to which the second source voltage VSSA_REF is applied). In an embodiment, the second source voltage VSSA_REF may be a ground voltage, but is not limited thereto. In such an embodiment, the first reference voltage generation circuit 211 may select one of the divided voltages using a decoder, and non-invert-amplify the one of the divided voltages using a buffer, to output the amplified divided voltage as the first reference voltage VREG1. The buffer may include an amplifier and resistors, the one divided voltage may be applied to an non-inverting terminal (+) of the amplifier, one of the resistors may be connected between an inverting terminal (−) and an output terminal of the amplifier, and another of the resistors may be connected between the inverting terminal (−) of the amplifier and the second source voltage VSSA_REF. The amplifier may receive the first source voltage VLIN1 and a third source voltage VSSA as driving power. In one embodiment, for example, the third source voltage VSSA may be the same as the second source voltage VSSA_REF, but is not limited thereto.

In such an embodiment, the second reference voltage generation circuit 212 may select another divided voltage from among the divided voltages using a decoder, and non-invert-amplify the other divided voltage using a buffer, to output the non-invert-amplified divided voltage as the second reference voltage VREF1. The third reference voltage generation circuit 213 may select further another divided voltage from among the divided voltages using a decoder, and non-invert-amplify the further other divided voltage using a buffer, to output the non-invert-amplified divided voltage as the third reference voltage NELVDD. Each configuration of the second reference voltage generation circuit 212 and the third reference voltage generation circuit 213 may be substantially the same as or similar to a configuration of the first reference voltage generation circuit 211.

In an embodiment, the reference voltage corrector may generate a first corrected reference voltage AVC_VREG1 and a second corrected reference voltage AVC_VREF1 by correcting the first reference voltage VERG1 and the second reference voltage VREF1 using the external power voltage ELVDD_EXT and a target voltage corresponding thereto. In such an embodiment, the first corrected reference voltage AVC_VREG1 may be equal to a maximum gamma voltage GAMMA_TOP (for example, a gamma voltage corresponding to a minimum grayscale) among the gamma voltages VGS. The second corrected reference voltage AVC_VREF1 may be equal to a minimum gamma voltage GAMMA_BOTTOM (for example, a gamma voltage corresponding to a maximum grayscale) among the gamma voltages VGS.

The reference voltage corrector may use the third reference voltage NELVDD generated by the reference voltage generator 210 as the target voltage, or set the target voltage based on at least one selected from the first reference voltage VREG1, the second reference voltage VREF1, and the second source voltage VSSA_REF.

The reference voltage corrector may include a first reference voltage corrector 220 (or a first reference voltage correction block) and a second reference voltage corrector 230 (or a second reference voltage correction block).

In an embodiment, the first reference voltage corrector 220 may output or generate the first corrected reference voltage AVC_VREG1 by associating the first reference voltage VREG1 with the external power voltage ELVDD_EXT. In such an embodiment, the first reference voltage corrector 220 may generate the first corrected reference voltage AVC_VREG1 by correcting the first reference voltage VREG1 based on the external power voltage ELVDD_EXT. In one embodiment, for example, the first reference voltage corrector 220 may generate the first corrected reference voltage AVC_VREG1 by reflecting a direct current ("DC") offset and an alternate current ("AC") fluctuation of the external power voltage ELVDD_EXT to the first reference voltage VREG1.

In an embodiment, the first reference voltage corrector 220 may output the first corrected reference voltage AVC_VREG1 by setting the target voltage corresponding to one of the first reference voltage VREG1, the third reference voltage NELVDD, and the second source voltage VSSA_REF and reflecting a difference between the target voltage and the external power voltage ELVDD_EXT to the first reference voltage VREG1.

In a display device 100, the first power voltage ELVDD provided from the power supply 160 to the display unit 110 may have a deviation from the test power voltage of the test device used in the gamma voltage setting process. In the gamma voltage setting process, for example, a resistance of a connector for connecting the display device 100 and the test device and a resistance of a connector for connecting the display unit 110 and the power supply 160 may be different from each other.

In addition, when the first power voltage ELVDD actually applied to the pixel PXL of FIG. 2 changes due to various reasons such as a wire resistance and a capacitance between wires, a desired driving current may not flow through the light emitting element LD in the pixel PXL, and the display quality of the display device 10 may be reduced.

Therefore, in an embodiment of the invention, the first reference voltage corrector 220 may generate the first corrected reference voltage AVC_VREG1 by correcting the first reference voltage VREG1 based on the target voltage of the first power voltage ELVDD and the external power voltage ELVDD_EXT.

The first reference voltage corrector 220 may include a first input terminal IN1, a second input terminal IN2, a third input terminal IN3, and a fourth input terminal IN4 (or may be connected to a first input node, a second input node, a third input node, and a fourth input node), the external power voltage ELVDD_EXT may be applied to the first input terminal IN1 (or the first input node), the first reference voltage VREG1 may be applied to the second input terminal IN2 (or the second input node), the third reference voltage NELVDD may be applied to the third input terminal IN3 (or the third input node), and the second source voltage VSSA_REF may be applied to the fourth input terminal IN4 (or the fourth input node). The first corrected reference voltage AVC_VREG1 may be output through an output terminal OUT (or a first output node) of the first reference voltage corrector 220. According to an embodiment, at least one selected from the third input terminal IN3 and the fourth input terminal IN4 may be omitted.

The configuration and operation of the first reference voltage corrector 220 will be described later in greater detail with reference to FIGS. 4 to 9, 11, and 12.

In an embodiment, the second reference voltage corrector 230 may output the second corrected reference voltage AVC_VREF1 by associating the second reference voltage VREF1 with the external power voltage ELVDD_EXT. In such an embodiment, the second reference voltage corrector 230 may output the second corrected reference voltage AVC_VREF1 by correcting the second reference voltage VREF1 based on the external power voltage ELVDD_EXT.

In an embodiment, the second reference voltage corrector 230 may output the second corrected reference voltage AVC_VREF1 by setting a target voltage corresponding to the second reference voltage VREF1 or the third reference voltage NELVDD and reflecting a difference between the target voltage and the external power voltage ELVDD_EXT to the second reference voltage VREF1.

The second reference voltage corrector 230 may include a first input terminal IN1, a second input terminal IN2, and a third input terminal IN3 (or may be connected to the first input node, a fifth input node, and the third input node), the external power voltage ELVDD_EXT may be applied to the first input terminal IN1 (or the first input node), the second reference voltage VREF1 may be applied to the second input terminal IN2 (or the fifth input node), and the third reference voltage NELVDD may be applied to the third input terminal IN3 (or the third input node). The second corrected reference voltage AVC_VREF1 may be output through an output terminal OUT (or a second output node) of the second reference voltage corrector 230. According to an embodiment, the third input terminal IN3 may be omitted.

The configuration and operation of the second reference voltage corrector 230 will be described later in greater detail with reference to FIGS. 10 to 12, 15, and 16.

The gamma voltage output unit 240 may divide the first corrected reference voltage AVC_VREG1 and the second corrected reference voltage AVC_VREF1 to output the gamma voltages VGS.

The gamma voltage output unit 240 may include a gamma resistor string RST_GAMMA.

The gamma resistor string RST_GAMMA may include or be configured of a plurality of resistors connected in series, and a voltage between the first corrected reference voltage AVC_VREG1 and the second corrected reference voltage AVC_VREF1 may be divided by the resistors. At least some of the divided voltages may be output as the gamma voltages VGS. In one embodiment, for example, the gamma resistor string RST_GAMMA may divide the voltage between the first corrected reference voltage AVC_VREG1 and the second corrected reference voltage AVC_VREF1 into 2048 voltages or voltages having 2048 different levels. In one embodiment, for example, the resistors may have a same resistance value as each other, and the divided voltages (or the gamma voltages VGS) may be linear or may have equal intervals. In one alternative embodiment, for example, the resistors may have different resistance values from each other, and the divided voltages (or the gamma voltages VGS) may be non-linear, and may have a gamma characteristic (or a gamma value) of, for example, 2.2.

In an embodiment, as shown in FIG. 3, the gamma voltage output unit 240 may include a single gamma resistor string RST_GAMMA, but is not limited thereto. In one alternative embodiment, for example, the gamma voltage output unit 240 may include two resistor strings, decoders (or multiplexers), and gamma amplifiers. The voltage between the first corrected reference voltage AVC_VREG1 and the second corrected reference voltage AVC_VREF1 may be divided through the first resistor string, reference gamma voltages (for example, 10 reference gamma voltages) may be selected through the decoders, the reference gamma voltages may be output through the gamma amplifiers, and the reference gamma voltages may be divided into a plurality of voltages (for example, 2048 voltages) through the second resistor string. The gamma voltage output unit 240 may have various structures configured or designed to generate the plurality of gamma voltages VGS using the two reference voltages (for example, the first corrected reference voltage AVC_VREG1 and the second corrected reference voltage AVC_VREF1).

The gamma voltages VGS may be provided to the data driver 130. The digital-to-analog converter DAC of the data driver 130 may select one of the gamma voltages VGS corresponding to a grayscale value (or a data value) in the image data DATA2, and a buffer SC_AMP (or a source amplifier) of the data driver 130 may output the one gamma voltage as the data signal.

Herein, the reference voltage generator 210, the first reference voltage corrector 220, the second reference voltage corrector 230, and the gamma voltage output unit 240 may be conceptually divided based on specific nodes (for example, the input terminals IN1, IN2, IN3, and IN4, and nodes corresponding to the output terminal OUT) in the gamma voltage generator 150. According to an embodiment, the first reference voltage corrector 220 and the second reference voltage corrector 230 may be referred to as one reference voltage corrector. According to an embodiment, the first reference voltage generation circuit 211 and the first reference voltage corrector 220 may be referred to as a first reference voltage generator, and the second reference voltage generation circuit 212 and the second reference voltage corrector 230 may be referred to as a second reference voltage generator.

Figure 4:
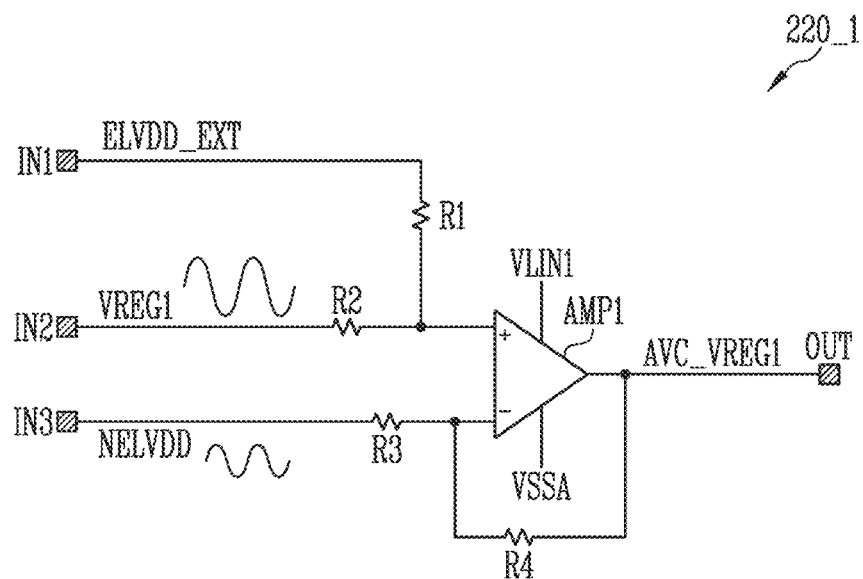
FIG. 4 is a diagram illustrating an embodiment of a first reference voltage corrector included in the gamma voltage generator of FIG. 3.
Figure 5:
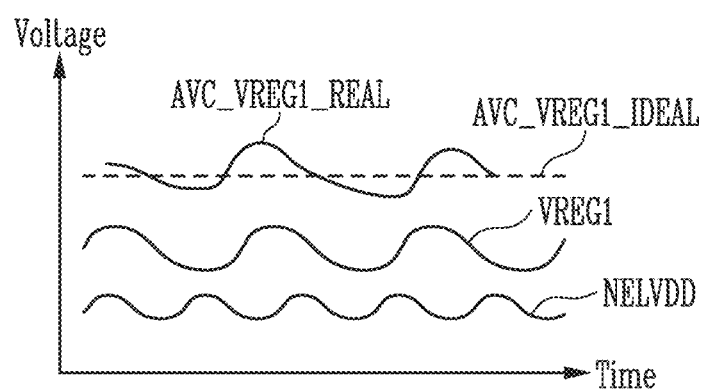
FIG. 5 is a waveform diagram illustrating signals measured by the first reference voltage corrector of FIG. 4.

FIG. 4 is a diagram illustrating an embodiment of the first reference voltage corrector included in the gamma voltage generator of FIG. 3. FIG. 5 is a waveform diagram illustrating signals measured by the first reference voltage corrector of FIG. 4.

Referring to FIGS. 3, 4, and 5, an embodiment of the first reference voltage corrector 220_1 may include a first amplifier AMP1 (or a differential amplifier), a first resistor R1, a second resistor R2, a third resistor R3, and a fourth resistor R4. The first resistor R1, the second resistor R2, the third resistor R3, and the fourth resistor R4 may have a same resistance values as each other, but are not limited thereto. In such an embodiment, each of the first resistor R1, the second resistor R2, the third resistor R3, and the fourth resistor R4 may correspond to a line resistance or may be configured of a separate component.

The first amplifier AMP1 may receive the first source voltage VLIN1 and the third source voltage VSSA as driving power, and for example, the third source voltage VSSA may be the same as the second source voltage VSSA_REF, but is not limited thereto.

The first resistor R1 may be connected between the first input terminal IN1 (or the first input node) and a non-inverting terminal + (or a first terminal) of the first amplifier AMP1, and the second resistor R2 may be connected between a second input terminal IN2 (or a second input node) and the non-inverting terminal (+) of the first amplifier AMP1. The external power voltage ELVDD_EXT may be applied to the first input terminal IN1, and the first reference voltage VREG1 may be applied to the second input terminal IN2. In such an embodiment, an intermediate value (or an average value) of the external power voltage ELVDD_EXT and the first reference voltage VREG1 may be applied to the non-inverting terminal (+) of the first amplifier AMP1.

The third resistor R3 may be connected between the third input terminal IN3 (or the third input node) and an inverting terminal (−) (or a second terminal) of the first amplifier AMP1, and the fourth resistor R4 may be connected between the inverting terminal (−) of the first amplifier AMP1 and an output terminal OUT (or a first output node) of the first amplifier AMP1. The third reference voltage NELVDD may be applied to the third input terminal IN3.

In such an embodiment, the first reference voltage corrector 220_1 may output the first corrected reference voltage AVC_VREG1 according to Equation 1 below.

$$AVC\_VREG1=(NELVDD-ELVDD\_EXT)+VREG1 \quad \text{[Equation 1]}$$

That is, the first corrected reference voltage AVC_VREG1 may be proportional to a value obtained by adding a voltage difference between the third reference voltage NELVDD and the external power voltage ELVDD_EXT to the first reference voltage VREG1. In such an embodiment, the first reference voltage VREG1 may be corrected according to the DC offset and the AC fluctuation of the external power voltage ELVDD_EXT. In such an embodiment, the gamma voltages VGS may be generated by the gamma voltage output unit 240 based on the first corrected reference voltage AVC_VREG1 in which the fluctuation of the external power voltage ELVDD_EXT is reflected, and the data signal may be generated based on the gamma voltages VGS, in which the fluctuation of the power voltage ELVDD_EXT is reflected, by the data driver 130. Therefore, the pixel PXL of FIG. 2 may emit light with a desired luminance, and the display quality of the display device 100 due to the fluctuation of the external power voltage ELVDD_EXT (or the first power voltage ELVDD) may be effectively prevented.

However, as shown in FIG. 5, when a phase and a magnitude (or an amplitude) of the first reference voltage VREG1 are different from a phase and a magnitude of the third reference voltage NELVDD, noise may be included in the first corrected reference voltage AVC_VREG1. In one embodiment, for example, the phase of the of the first reference voltage VREG1 may be different from the phase of the third reference voltage NELVDD due to a characteristic difference of the buffer of the first reference voltage generation circuit 211 (refer to FIG. 3) and the buffer of the third reference voltage generation circuit 213 (refer to FIG. 3).

In a case, for example, the third reference voltage NELVDD may be about 2.8 V, the external power voltage ELVDD_EXT may be about 2.8 V, the first reference voltage VREG1 may be about 5.7 V, and the phase and the amplitude of the third reference voltage NELVDD may be different from the phase and the amplitude of the external power voltage ELVDD_EXT. In this case, according to Equation 1, the first corrected reference voltage AVC_VREG1 may be "5.7 V+α (that is, noise)" (that is, 2.8 V−2.8 V+5.7 V+α). As shown in FIG. 5, the first corrected reference voltage AVC_VREG1_REAL actually output from the first reference voltage corrector 220_1 may include noise of an AC form differently from a desired form of the first corrected reference voltage AVC_VREG1_IDEAL (that is, a DC form).

Therefore, when the phase and the magnitude (or the amplitude) of the first reference voltage VREG1 are different from the phase and the magnitude of the third reference voltage NELVDD, the first reference voltage corrector 220 (refer to FIG. 3) may remove the noise generated in a process of associating the first reference voltage VREG1 with the external power voltage ELVDD_EXT, by using at least one of the reference voltage VREG1 and the second source voltage VSSA_REF.

Figure 6:
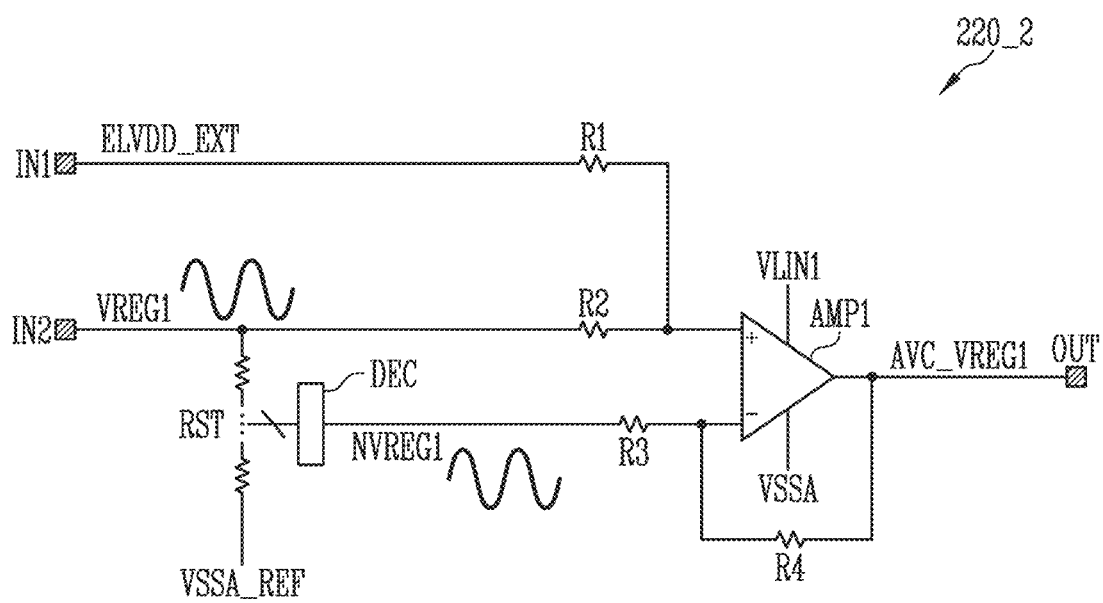
FIG. 6 is a diagram illustrating an alternative embodiment of the first reference voltage corrector included in the gamma voltage generator of FIG. 3.
Figure 7:
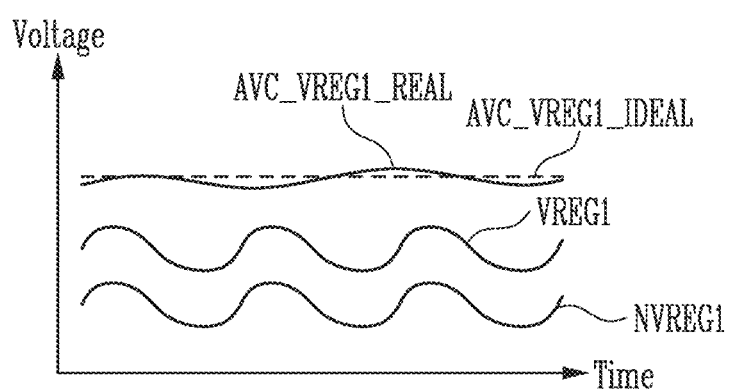
FIG. 7 is a waveform diagram illustrating signals measured by the first reference voltage corrector of FIG. 6.

FIG. 6 is a diagram illustrating an alternative embodiment of the first reference voltage corrector included in the gamma voltage generator of FIG. 3. FIG. 7 is a waveform diagram illustrating signals measured by the first reference voltage corrector of FIG. 6.

Referring to FIGS. 3, 4, 6, and 7, compared to the first reference voltage corrector 220_1 of FIG. 4, an embodiment of the first reference voltage corrector 220_2 of FIG. 6 may further include a resistor string RST and a decoder DEC. Except for the resistor string RST and the decoder DEC, the first reference voltage corrector 220_2 of FIG. 6 is similar to the first reference voltage corrector 220_1 of FIG. 4, and thus any repetitive detailed description of same or like elements thereof will hereinafter be omitted.

The resistor string RST (or a first resistor string) may divide a voltage between the first reference voltage VREG1 and the second source voltage using a plurality of resistors connected between the second input terminal IN2 and the second source voltage VSSA_REF, and the decoder DEC (or a first decoder) may select and output one of the divided voltages as a first target voltage NVREG1. The third resistor R3 may be connected between an output terminal of the decoder DEC and the inverting terminal (−) of the first amplifier AMP1. The first target voltage NVREG1 may be set to have a DC component that is substantially the same as the third reference voltage NELVDD through control of the decoder DEC, and may have a phase (and an amplitude) similar to the phase (and the amplitude) of the first reference voltage VREG1 as the first target voltage NVREG1 is generated based on the first reference voltage VREG1. That is, instead of the third reference voltage NELVDD shown in FIG. 4, the first target voltage NVREG1 having the phase (and the amplitude) similar to the phase (and the amplitude) of the first reference voltage VREG1 is generated, and may be applied to Equation 1.

In such an embodiment, as shown in FIG. 7, the first corrected reference voltage AVC_VREG1_REAL actually output from the first reference voltage corrector 220_2 may become similar to the desired first corrected reference voltage AVC_VREG1_IDEAL (that is, DC) or may become flat. That is, noise of the first reference voltage VREG1 may be removed.

In an embodiment, as described with reference to FIGS. 6 and 7, the first reference voltage corrector 220_2 may generate the first target voltage NVREG1 having noise similar to that of the first reference voltage VREG1 by dividing the first reference voltage VREG1, and generate the first corrected reference voltage AVC_VREG1 using the first reference voltage VREG1, the external power voltage ELVDD_EXT, and the first target voltage NVREG1. Therefore, the first corrected reference voltage AVC_VREG1 may be associated with the external power voltage ELVDD_EXT, and the noise of the first reference voltage VREG1 may be removed by the first target voltage NVREG1.

Figure 8:
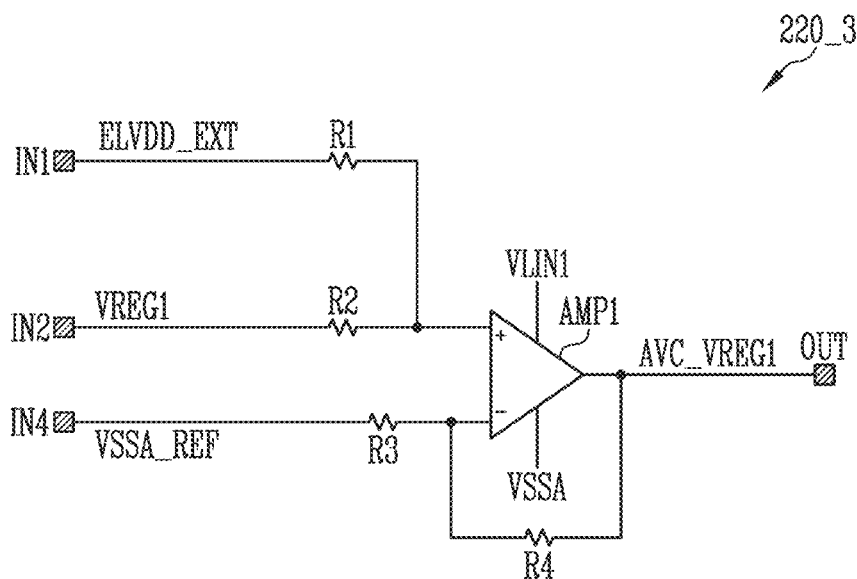
FIG. 8 is a diagram illustrating another alternative embodiment of the first reference voltage corrector included in the gamma voltage generator of FIG. 3.

FIG. 8 is a diagram illustrating another alternative embodiment of the first reference voltage corrector included in the gamma voltage generator of FIG. 3.

Referring to FIGS. 3, 4, 7, and 8, except for a connection configuration of the third resistor R3, the first reference voltage corrector 220_3 of FIG. 8 may be substantially the same as or similar to the first reference voltage corrector 220_1 of FIG. 4. Therefore, any repetitive detailed description of same or like elements will hereinafter be omitted.

In such an embodiment, the third resistor R3 may be connected between the fourth input terminal IN4 (or the fourth input node) and the inverting terminal (−) of the first amplifier AMP1. The second source voltage VSSA_REF may be applied to the fourth input terminal IN4. Here, the second source voltage VSSA_REF may be a ground voltage. That is, the first reference voltage corrector 220_3 may set the second source voltage VSSA_REF as the target voltage.

For reference, the noise of the first reference voltage VREG1 may be introduced through the second source voltage VSSA_REF1 (and the buffer of the first reference voltage generation circuit 211). Therefore, the first reference voltage corrector 220_3 may remove the noise of the first reference voltage VREG1 using the second source voltage VSSA_REF instead of the third reference voltage NELVDD shown in FIG. 4. That is, the second source voltage VSSA_REF may be applied to Equation 1 instead of the third reference voltage NELVDD.

In such an embodiment, as shown in FIG. 7, the first corrected reference voltage AVC_VREG1_REAL actually output from the first reference voltage corrector 220_3 may be similar to the desired first corrected reference voltage AVC_VREG1_IDEAL (that is, voltage in a DC form), or may become flat.

In such an embodiment, as described above with reference to FIG. 8, the first reference voltage corrector 220_3 may generate the first corrected reference voltage AVC_VREG1 using the first reference voltage VREG1, the external power voltage ELVDD_EXT, and the second source voltage VSSA_REF. Therefore, the first corrected reference voltage AVC_VREG1 may be associated with the external power voltage ELVDD_EXT, and the noise of the first reference voltage VREG1 due to the second source voltage VSSA_REF (or the ground voltage) may be removed by the second source voltage VSSA_REF.

Figure 9:
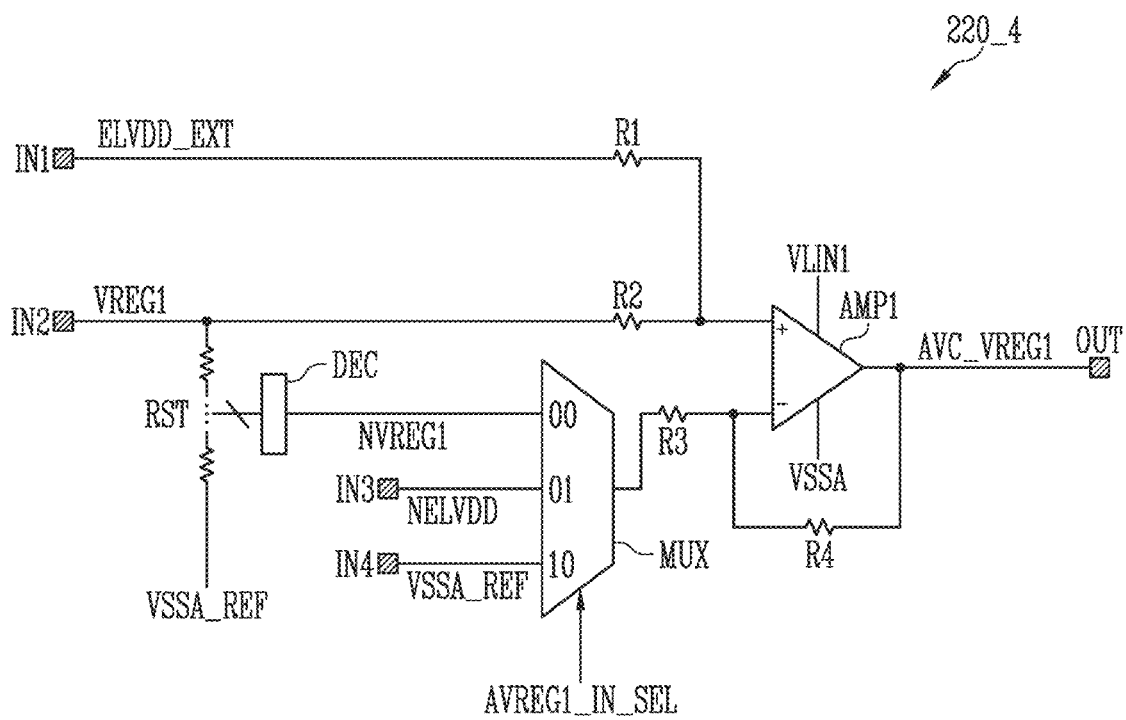
FIG. 9 is a diagram illustrating further another alternative embodiment of the first reference voltage corrector included in the gamma voltage generator of FIG. 3.

FIG. 9 is a diagram illustrating still another alternative embodiment of the first reference voltage corrector included in the gamma voltage generator of FIG. 3.

Referring to FIGS. 3 to 9, compared to the first reference voltage corrector 220_1 of FIG. 4, the first reference voltage corrector 220_4 of FIG. 9 may further include a resistor string RST (or a first resistor string), a decoder DEC (or a first decoder), and a multiplexer MUX (or a selector).

Since the resistor string RST and the decoder DEC are substantially the same as or similar to the resistor string RST and the decoder DEC described above with reference to FIG. 6, any repetitive detailed description thereof will hereinafter be omitted.

In such an embodiment, the multiplexer MUX may include three input terminals. A first input terminal of the multiplexer MUX may be connected to the output terminal of the decoder DEC, and the first target voltage NVREG1 may be applied to the first input terminal of the multiplexer MUX. A second input terminal of the multiplexer MUX may be connected to the third input terminal IN3 (or the third input node), and the third reference voltage NELVDD may be applied to the second input terminal of the multiplexer MUX. The third input terminal of the multiplexer MUX may be connected to the fourth input terminal IN4 (or the fourth input node), and the second source voltage VSSA_REF may be applied to the third input terminal of the multiplexer MUX. The third resistor R3 may be connected between an output terminal of the multiplexer MUX and the inverting terminal (−) of the first amplifier AMP1.

The multiplexer MUX may select and output a signal applied to one of the input terminals based on a first selection signal AVREG1_IN_SEL. The first selection signal AVREG1_IN_SEL may be provided from an outside (for example, a timing controller or a setting pin). In one embodiment, for example, the first selection signal AVREG1_IN_SEL may have a value of 2 bits. When the value of the first selection signal AVREG1_IN_SEL is "00", the first target voltage NVREG1 may be output, when the value of the first selection signal AVREG1_IN_SEL is "01", the third reference voltage NELVDD may be output, when the value of the first selection signal AVREG1_IN_SEL is "10", the second source voltage VSSA_REF may be output. When the gamma voltage generator 150 including the first reference voltage corrector 220_4 is disposed mounted on the display device 100 (refer to FIG. 1), the value of the first selection signal AVREG1_IN_SEL may be set for optimizing the first corrected reference voltage AVC_VREG1 in a method of measuring the gamma voltages BGS while changing the value of the first selection signal AVREG1_IN_SEL. That is, the first reference voltage corrector 220_1 of FIG. 4, the first reference voltage corrector 220_2 of FIG. 6, and the first reference voltage corrector 220_3 of FIG. 8 may be selectively used.

In such an embodiment, as described above with reference to FIG. 9, the first reference voltage corrector 220_4 may generate the first target voltage NVREG1 having noise similar to that of the first reference voltage VREG1 by dividing the first reference voltage VREG1, select one of the third reference voltage NELVDD, the first target voltage NVREG1, and the second source voltage VSSA_REF (or set one of the third reference voltage NELVDD, the first target voltage NVREG1, and the second source voltage VSSA_REF as the target voltage), and generate the first corrected reference voltage AVC_VREG1 using the selected one (or the set target voltage), the first reference voltage VREG1, and the external power voltage ELVDD_EXT. Therefore, the first corrected reference voltage AVC_VREG1 may be associated with the external power voltage ELVDD_EXT, and the noise of the first reference voltage VREG1 generated in various forms for each product may be removed by the one selected from the third reference voltage NELVDD, the first target voltage NVREG1, and the second source voltage VSSA_REF.

Figure 10:
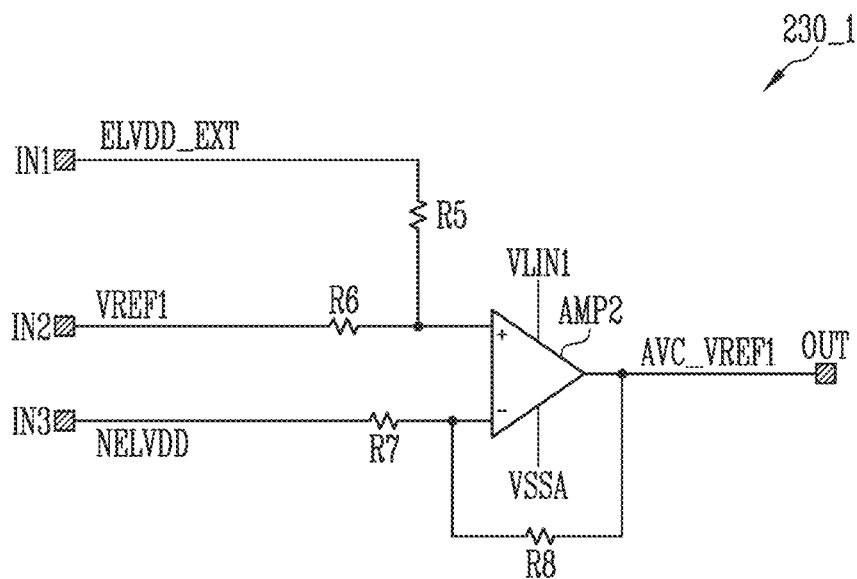
FIG. 10 is a diagram illustrating an embodiment of a second reference voltage corrector included in the gamma voltage generator of FIG. 3.

FIG. 10 is a diagram illustrating an embodiment of the second reference voltage corrector included in the gamma voltage generator of FIG. 3.

Referring to FIGS. 3 and 10, an embodiment of the second reference voltage corrector 230_1 may include a second amplifier AMP2 (or a differential amplifier), a fifth resistor R5, a sixth resistor R6, a seventh resistor R7, and an eighth resistor R8. The fifth resistor R5, the sixth resistor R6, the seventh resistor R7, and the eighth resistor R8 may have a same resistance value as each other, but are not limited thereto. In an embodiment, each of the fifth resistor R5, the sixth resistor R6, the seventh resistor R7, and the eighth resistor R8 may correspond to a line resistance or may be configured of a separate component.

The second amplifier AMP2 may receive the first source voltage VLIN1 and the third source voltage VSSA as driving power. In one embodiment, for example, the third source voltage VSSA may be the same as the second source voltage VSSA_REF, but is not limited thereto.

The fifth resistor R5 may be connected between the first input terminal IN1 (or the first input node) and a non-inverting terminal (+) of the second amplifier AMP2, and the sixth resistor R6 may be connected between the second input terminal IN2 (or the fifth input node) and the non-inverting terminal (+) of the second amplifier AMP2. The external power voltage ELVDD_EXT may be applied to the first input terminal IN1, and the second reference voltage VREF1 may be applied to the second input terminal IN2. In such an embodiment, an intermediate value (or an average value) of the external power voltage ELVDD_EXT and the second reference voltage VREF1 may be applied to the non-inverting terminal (+) of the second amplifier AMP2.

The seventh resistor R7 may be connected between the third input terminal IN3 (or the third input node) and an inverting terminal (−) of the second amplifier AMP2, and the eighth resistor R8 may be connected between the inverting terminal (−) of the second amplifier AMP2 and an output terminal OUT (or a second output node) of the second amplifier AMP2. The third reference voltage NELVDD may be applied to the third input terminal IN3.

In such an embodiment, the second reference voltage corrector 230_1 may output the second corrected reference voltage AVC_VREF1 according to Equation 2 below.

$$AVC\_VREF1=(NELVDD-ELVDD\_EXT)+VREF1 \quad \text{[Equation 2]}$$

That is, the second corrected reference voltage AVC_VREF1 may be proportional to a value obtained by adding a voltage difference between the third reference voltage NELVDD and the external power voltage ELVDD_EXT to the second reference voltage VREF1. In such an embodiment, the second reference voltage VREF1 may be corrected according to the DC offset and the AC fluctuation of the external power voltage ELVDD_EXT.

In such an embodiment, similar to a relationship between the first reference voltage VREG1 and the third reference voltage NELVDD described above with reference to FIG. 5, when a phase and a magnitude (or an amplitude) of the second reference voltage VREF1 are different from the phase and the magnitude of the third reference voltage NELVDD, noise may be included in the second corrected reference voltage AVC_VREF1. That is, the second corrected reference voltage actually output from the second reference voltage corrector 230_1 may include noise of an AC form, differently from a desired second corrected reference voltage (that is, a voltage in a DC form).

Therefore, in an embodiment, when the phase and the magnitude (or the amplitude) of the second reference voltage VREF1 are different from the phase and the magnitude of the third reference voltage NELVDD, the second reference voltage corrector 230 (refer to FIG. 3) may remove the noise of the second reference voltage VREF1 by generating a second target voltage NVREF1 (refer to FIG. 11) based on the second reference voltage VREF1 instead of the third reference voltage NELVDD.

Figure 11:
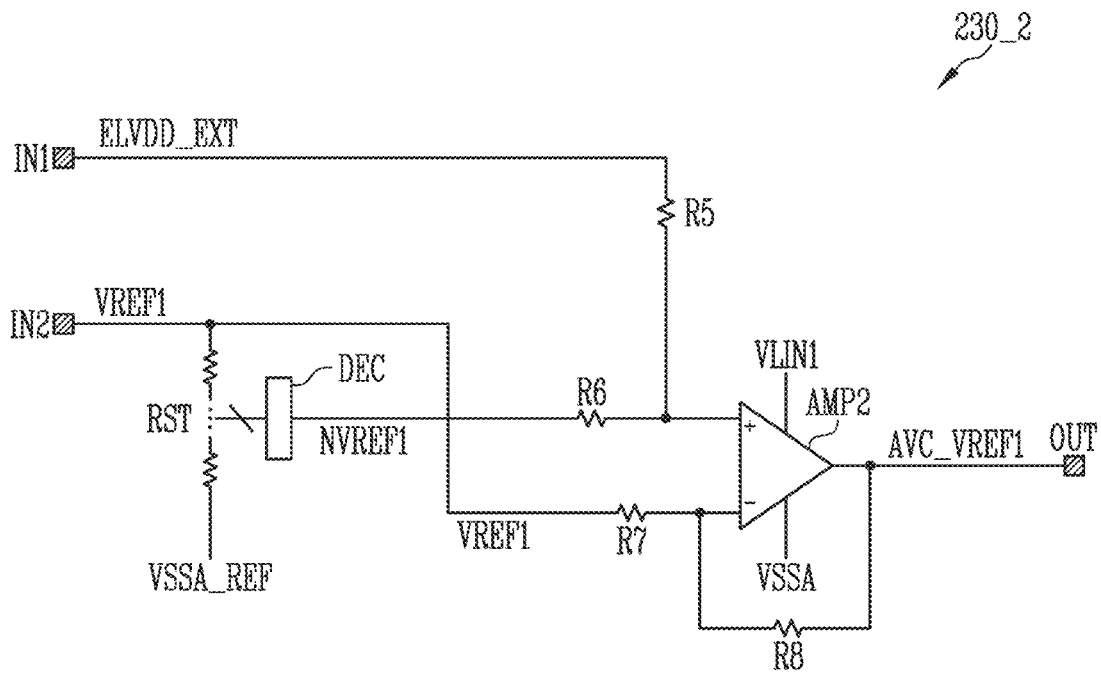
FIG. 11 is a diagram illustrating an alternative embodiment of the second reference voltage corrector included in the gamma voltage generator of FIG. 3.

FIG. 11 is a diagram illustrating an alternative embodiment of the second reference voltage corrector included in the gamma voltage generator of FIG. 3.

Referring to FIGS. 3, 10, and 11, compared to the second reference voltage corrector 230_1 of FIG. 10, the second reference voltage corrector 230_2 of FIG. 11 may further include a resistor string RST and a decoder DEC. Except for the resistor string RST and the decoder DEC, the second reference voltage corrector 230_2 of FIG. 11 is similar to the second reference voltage corrector 230_1 of FIG. 10, and thus any repetitive detailed description of the same or like elements will hereinafter be omitted.

The resistor string RST (or a second resistor string) may divide a voltage between the second reference voltage VREF1 and the second source voltage VSSA_REF using a plurality of resistors connected between the second input terminal IN2 and the second source voltage VSSA_REF, and the decoder DEC (or a second decoder) may select and output one of the divided voltages as the second target voltage NVREF1.

The sixth resistor R6 may be connected between the output terminal of the decoder DEC and the non-inverting terminal (+) of the second amplifier AMP2. The seventh resistor R7 may be connected between the second input terminal IN2 (or the fifth input node) and the inverting terminal (−) of the second amplifier AMP2.

The second target voltage NVREF1 may be generated by dividing the second reference voltage VREF1 and the second source voltage VSSA_REF, and the voltage level of the second reference voltage VREF1 may be lower than the voltage level of the external power voltage ELVDD_EXT. In such an embodiment, a voltage level of the second target voltage NVREF1 may be lower than the voltage level of the external power voltage ELVDD_EXT, and the second target voltage NVREF1 may not be suitable as a comparison reference of the external power voltage ELVDD_EXT. Therefore, the second reference voltage corrector 230_2 of FIG. 11 may compensate the second target voltage NVREF1 in proportion to a voltage difference between the external power voltage ELVDD_EXT and the second reference voltage VREF1.

In such an embodiment, the second reference voltage corrector 230_2 may output the second corrected reference voltage AVC_VREF1 according to Equation 3 below.

$$AVC\_VREF1=ELVDD\_EXT-VREF1+NVREF1 \quad \text{[Equation 3]}$$

In a case, for example, the external power voltage ELVDD_EXT may be about 2.8 V, the second reference voltage VREF1 may be about 2.8 V, the second target voltage NVREF1 may be about 0.5 V, the second target voltage NVREF1 generated based on the second reference voltage VREF1 may have a same phase as the phase of the second reference voltage VREF1. In this case, according to Equation 3, the second corrected reference voltage AVC_VREF1 may be about 0.5 V (2.8 V−2.8 V+0.5 V). Similarly to the first corrected reference voltage AVC_VREG1_REAL actually output from the first reference voltage corrector 220_2 described above with reference to FIG. 7, the second corrected reference voltage actually output from the second reference voltage corrector 230_2 may be similar to a desired second corrected reference voltage AVC_VREG1_IDEAL (that is, a voltage in a DC form) or may become flat.

In an embodiment, as described above with reference to FIG. 11, the second reference voltage corrector 230_2 may generate the second target voltage NVREF1 having noise similar to that of the second reference voltage VREF1 by dividing the second reference voltage VREF1, and generate the second corrected reference voltage AVC_VREF1 using the second reference voltage VREF1, the external power voltage ELVDD_EXT, and the second target voltage NVREF1. Therefore, the second corrected reference voltage AVC_VREF1 may be associated with the external power voltage ELVDD_EXT, and noise of the second reference voltage VREF1 and the second target voltage NVREF1 may cancel each other.

Figure 12:
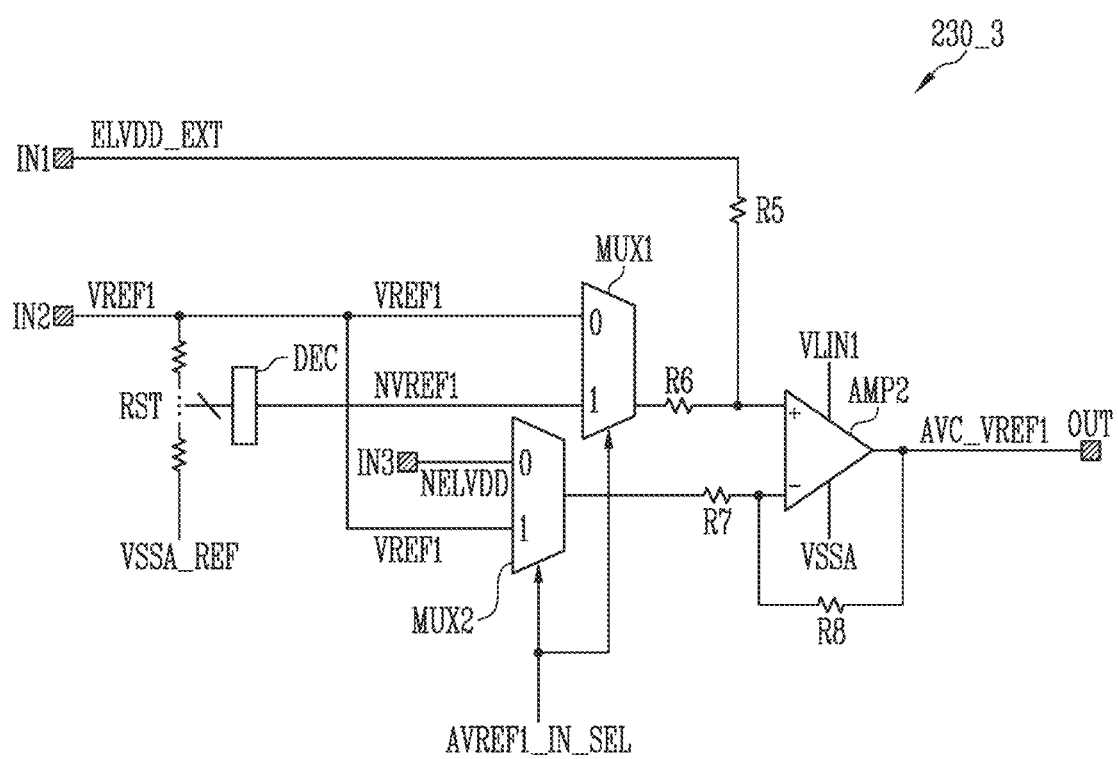
FIG. 12 is a diagram illustrating another alternative embodiment of the second reference voltage corrector included in the gamma voltage generator of FIG. 3.

FIG. 12 is a diagram illustrating another alternative embodiment of the second reference voltage corrector included in the gamma voltage generator of FIG. 3.

Referring to FIGS. 3, 10 to 12, compared to the second reference voltage corrector 230_1 of FIG. 10, the second reference voltage corrector 230_3 of FIG. 11 may further include a resistor string RST, a decoder DEC, a first multiplexer MUX1, and a second multiplexer MUX2.

Since the resistor string RST and the decoder DEC are substantially the same as or similar to the resistor string RST and the decoder DEC described with reference to FIG. 11, any repetitive detailed description of the same or like elements will hereinafter be omitted.

In an embodiment, as shown in FIG. 12, each of the first multiplexer MUX1 and the second multiplexer MUX2 may include two input terminals.

A first input terminal of the first multiplexer MUX1 may be connected to the second input terminal IN2 (or the fifth input node), and the second reference voltage VREF1 may be applied to the first input terminal of the first multiplexer MUX1. A second input terminal of the first multiplexer MUX1 may be connected to the output terminal of the decoder DEC, and the second target voltage NVREF1 may be applied to the second input terminal of the first multiplexer MUX1. The sixth resistor R6 may be connected between an output terminal of the first multiplexer MUX1 and the non-inverting terminal (+) of the second amplifier AMP2.

A first input terminal of the second multiplexer MUX2 may be connected to the third input terminal IN3 (or the third input node), and the third reference voltage NELVDD may be applied to the first input terminal of the second multiplexer MUX2. A second input terminal of the second multiplexer MUX2 may be connected to the second input terminal IN2 (or the fifth input node), and the second reference voltage VREF1 may be applied to the second input terminal of the second multiplexer MUX2. The seventh resistor R7 may be connected between an output terminal of the second multiplexer MUX2 and the inverting terminal (−) of the second amplifier AMP2.

Each of the first and second multiplexers MUX1 and MUX2 may select and output a signal applied to one of the input terminals based on a second selection signal AVREF1_IN_SEL. Similar to the first selection signal AVREG1_IN_SEL, the second selection signal AVREF1_IN_SEL may be provided from the outside (for example, the timing controller or the setting pin). In one embodiment, for example, the second selection signal AVREF1_IN_SEL may have a value of 1 bit. When a value of the second selection signal AVREF1_IN_SEL is "0", the second reference voltage VREF1 may be output from the first multiplexer MUX1 and the third reference voltage NELVDD may be output from the second multiplexer MUX2. When the value of the second selection signal AVREF1_IN_SEL is "1", the second target voltage NVREF1 may be output from the first multiplexer MUX1 and the second reference voltage VREF1 may be output from the second multiplexer MUX2.

In such an embodiment, the second reference voltage corrector 230_1 of FIG. 10 and the second reference voltage corrector 230_2 of FIG. 11 may be selectively used.

In an embodiment, as described above with reference to FIG. 12, the second reference voltage corrector 230_3 may generate the second target voltage NVREF1 having noise similar to that of the second reference voltage VREF1 by dividing the second reference voltage VREF1, and generate the second corrected reference voltage AVC_VREF1 using the third reference voltage NELVDD or the second target voltage NVREF1, the second reference voltage VREF1, and the external power voltage ELVDD_EXT. Therefore, the second corrected reference voltage AVC_VREF1 may be associated with the external power voltage ELVDD_EXT, and the noise of the second reference voltage VREF1 may be removed by the third reference voltage NELVDD or the second target voltage NVREF1.

Figure 13:
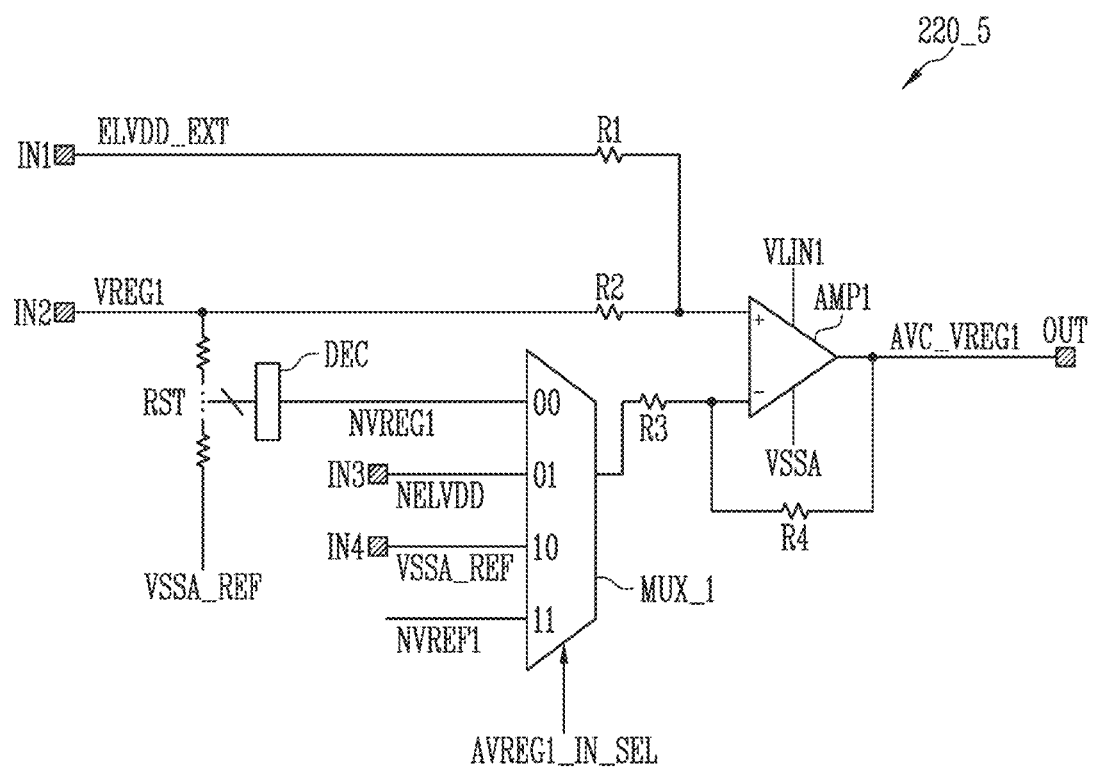
FIGS. 13 and 14 are diagrams illustrating still another alternative embodiment of the first reference voltage corrector included in the gamma voltage generator of FIG. 3.
Figure 14:
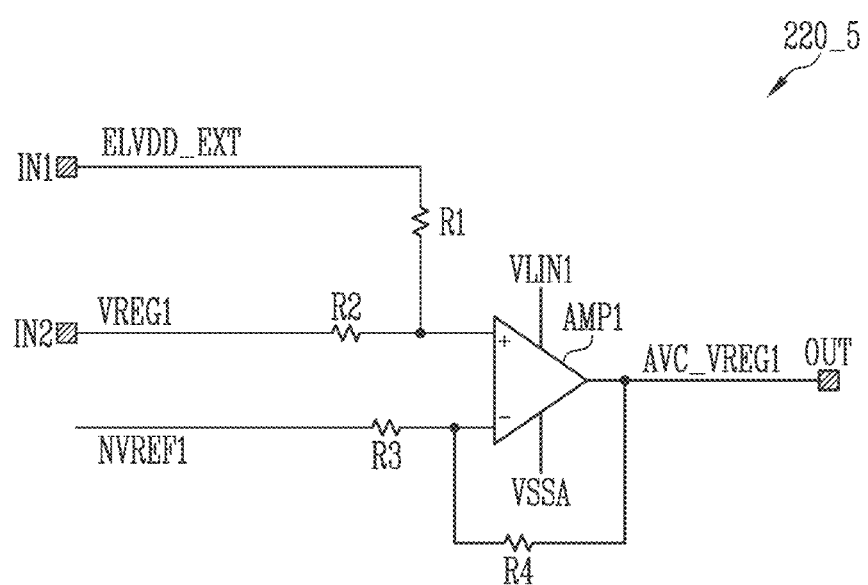

FIGS. 13 and 14 are diagrams illustrating still another alternative embodiment of the first reference voltage corrector included in the gamma voltage generator of FIG. 3.

First, referring to FIGS. 3, 4, 7, 9, 11, 12, and 13, except for a multiplexer MUX_1, the first reference voltage corrector 220_5 of FIG. 13 may be substantially the same as or similar to the first reference voltage corrector 220_4 of FIG. 9. Therefore, any repetitive detailed description of the same or like elements will hereinafter be omitted.

In an embodiment, the multiplexer MUX_1 may include four input terminals. A connection configuration of the first, second, and third input terminals of the multiplexer MUX_1 may be substantially the same as a connection configuration of the first, second, and third input terminals of the multiplexer MUX shown in FIG. 9. In such an embodiment, since an operation of the multiplexer MUX_1 is substantially the same as or similar to an operation of the multiplexer MUX described with reference to FIG. 9, any repetitive detailed description thereof will be omitted.

The second target voltage NVREF1 may be applied to the fourth input terminal of the multiplexer MUX_1. In one embodiment, for example, the fourth input terminal of the multiplexer MUX_1 may be connected to the decoder DEC (or the second decoder) of the second reference voltage corrector 230_2 of FIG. 11 or the decoder DEC of the second reference voltage corrector 230_3 of FIG. 12. In such an embodiment, the first reference voltage corrector 220_5 may configure the gamma voltage generator 150 together with the second reference voltage corrector 230_2 of FIG. 11 or the second reference voltage corrector 230_3 of FIG. 12. However, the disclosure is not limited thereto, and the first reference voltage corrector 220_5 may further include the resistor string RST (or the second resistor string) and the decoder DEC (or the second decoder) as described above with reference to FIG. 11, and generate the second target voltage NVREF1 using the second reference voltage VREF1, the resistor string RST (or the second resistor string), and the decoder DEC (or the second decoder).

The multiplexer MUX_1 may select and output a signal applied to one of the input terminals based on the first selection signal AVREG1_IN_SEL. In one embodiment, for example, the first selection signal AVREG1_IN_SEL has a value of 2 bits, and when the value of the first selection signal AVREG1_IN_SEL is "11", the second target voltage NVREF1 may be output. In such an embodiment, a circuit shown in FIG. 14 may be configured in a way such that the second target voltage NVREF1 may be used as the target voltage, and the second target voltage NVREF1 may be applied to Equation 1 instead of the third reference voltage NELVDD.

In an embodiment, as described above with reference to FIGS. 13 and 14, the first reference voltage corrector 220_5 may select one of the first target voltage NVREG1 (that is, the first target voltage NVREG1 having the noise similar to that of the first reference voltage VREG1 by dividing the first reference voltage VREG1), the second target voltage NVREF1 (that is, the second target voltage NVREF1 having the noise similar to that of the second reference voltage VREF1 by dividing the second reference voltage VREF1), the third reference voltage NELVDD, and the second source voltage VSSA_REF (or set one of the first target voltage NVREG1, the second target voltage NVREF1, the third reference voltage NELVDD, and the second source voltage VSSA_REF as the target voltage), and generate the first corrected reference voltage AVC_VREG1 using the selected one (or the set target voltage), the first reference voltage VREG1, and the external power voltage ELVDD_EXT. Therefore, the first corrected reference voltage AVC_VREG1 may be associated with the external power voltage ELVDD_EXT, and the noise of the first reference voltage VREG1 generated in various forms for each product may be removed by one selected from the third reference voltage NELVDD, the first target voltage NVREG1, the second target voltage NVREF1, and the second source voltage VSSA_REF.

In an embodiment, as shown in FIG. 13, when the value of the first selection signal AVREG1_IN_SEL is "11", the circuit may be configured as that of FIG. 14 (that is, the first reference voltage corrector 220_5), but the disclosure is not limited thereto. In one alternative embodiment, for example, the first reference voltage corrector 220_5 may not include the resistor string RST (or the first resistor string), the decoder DEC (or the first decoder), and the multiplexer MUX1 shown in FIG. 13, and include only the first amplifier AMP1 (or the differential amplifier), the first resistor R1, the second resistor R2, the third resistor R3, and the fourth resistor R4 as shown in FIG. 14.

Figure 15:
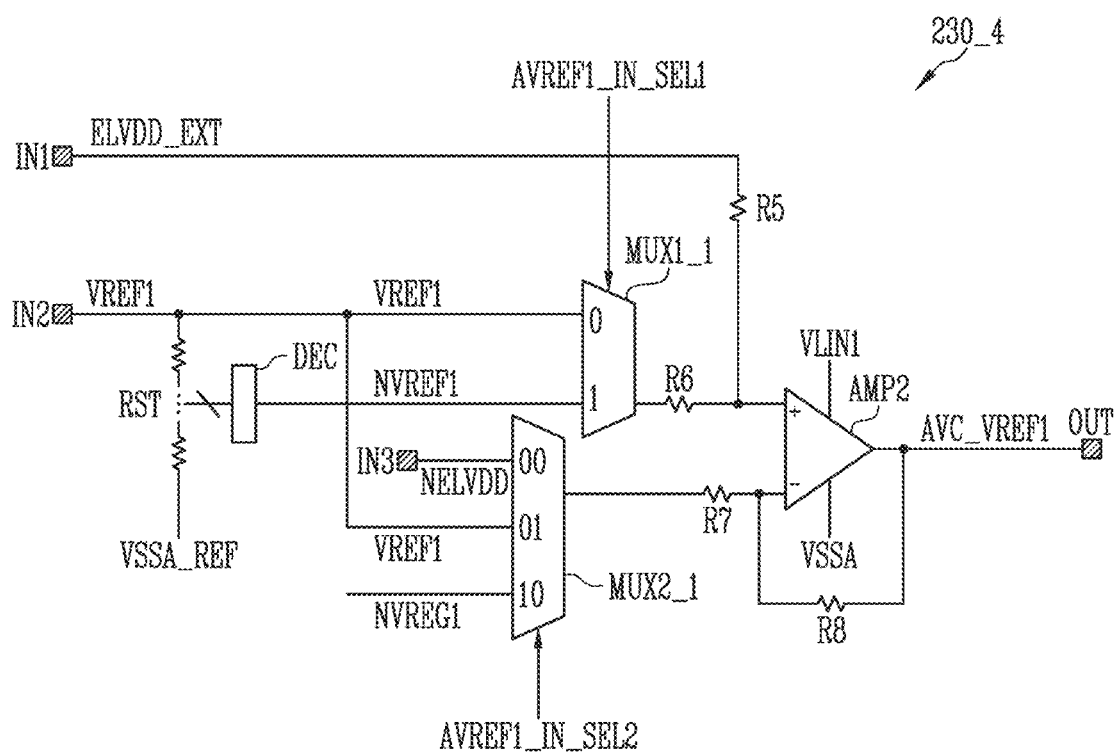
FIGS. 15 and 16 are diagrams illustrating further still another alternative embodiment of the second reference voltage corrector included in the gamma voltage generator of FIG. 3.
Figure 16:
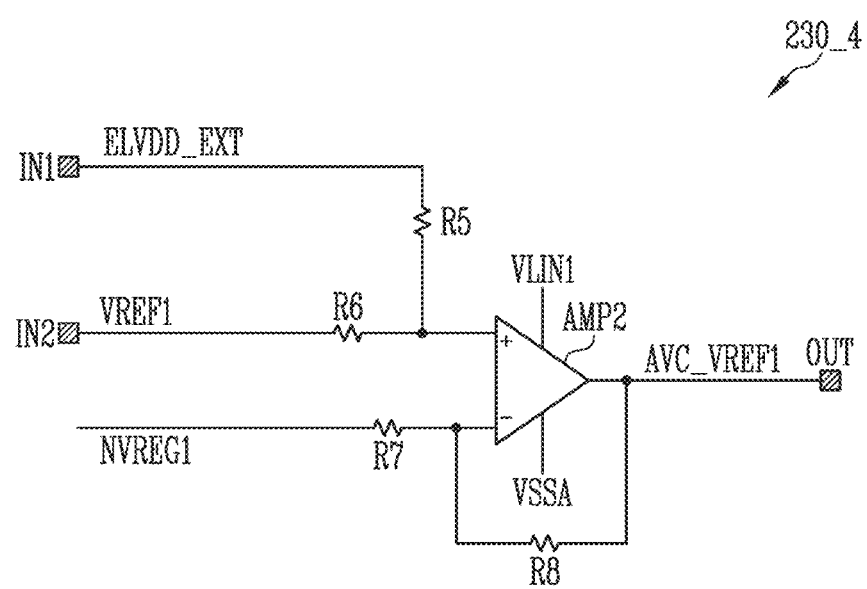

FIGS. 15 and 16 are diagrams illustrating further still another alternative embodiment of the second reference voltage corrector included in the gamma voltage generator of FIG. 3.

First, referring to FIGS. 3, 6, 9, 10 to 12, and 15, except for a first multiplexer MUX1_1 and a second multiplexer MUX2_1, the second reference voltage corrector 230_4 of FIG. 15 may be substantially the same as or similar to the second reference voltage corrector 230_3 of FIG. 12. Therefore, any repetitive detailed description of the same or like elements will hereinafter be omitted.

A connection configuration and an operation of the first multiplexer MUX1_1 may be substantially the same as or similar to a connection configuration and an operation of the first multiplexer MUX1 described with reference to FIG. 12. The first multiplexer MUX1_1 may select and output a signal applied to one of the input terminals based on a first sub select signal AVREF1_IN_SEL1. The first sub selection signal AVREF1_IN_SEL1 may be included in the second selection signal that controls the operation of the second reference voltage corrector 230_4, and may be provided from the outside (for example, the timing controller or the setting pin).

The second multiplexer MUX2_1 may include three input terminals. A connection configuration of the first and second input terminals of the second multiplexer MUX2_1 may be substantially the same as a connection configuration of the first and second input terminals of the second multiplexer MUX2_1 shown in FIG. 12. In such an embodiment, since an operation of the second multiplexer MUX2_1 is substantially the same as or similar to an operation of the second multiplexer MUX2_1 described above with reference to FIG. 12, any repetitive detailed description thereof will be omitted.

In an embodiment, the first target voltage NVREG1 may be applied to a third input terminal of the second multiplexer MUX2_1. In one embodiment, for example, the third input terminal of the second multiplexer MUX2_1 may be connected to the decoder DEC (or the first decoder) of the first reference voltage corrector 220_2 of FIG. 6 or the decoder DEC of the first reference voltage corrector 220_4 of FIG. 9. In such an embodiment, the second reference voltage corrector 230_4 may configure the gamma voltage generator 150 together with the first reference voltage corrector 220_2 of FIG. 6 or the first reference voltage corrector 220_4 of FIG. 9. However, the disclosure is not limited thereto, and the second reference voltage corrector 230_4 may further include the resistor string RST (or the first resistor string) and the decoder DEC (or the first decoder) as described with reference to FIG. 6, and generate the first target voltage NVREG1 using the first reference voltage VREG1, the resistor string RST (or the first resistor string), and the decoder DEC (or the first decoder). The second multiplexer MUX2_1 may select and output a signal applied to one of the input terminals based on a second sub selection signal AVREF1_IN_SEL2. The second sub select signal AVREF1_IN_SEL2 may be included in the second select signal that controls the operation of the second reference voltage corrector 230_4.

In one embodiment, for example, when a value of the first sub selection signal AVREF1_IN_SEL1 is "0" and a value of the second sub selection signal AVREF1_IN_SEL2 is "00", the second reference voltage VREF1 may be output from the first multiplexer MUX1_1, and the third reference voltage NELVDD may be output from the second multiplexer MUX2_1. In such an embodiment, when the value of the first sub selection signal AVREF1_IN_SEL1 is "1" and the value of the second sub selection signal AVREF1_IN_SEL2 is "01", the second target voltage NVREF1 may be output from the first multiplexer MUX1_1, and the second reference voltage VREF1 may be output from the second multiplexer MUX2_1.

In such an embodiment, when the value of the first sub selection signal AVREF1_IN_SEL1 is "0" and the value of the second sub selection signal AVREF1_IN_SEL2 is "10", the second reference voltage VREF1 may be output from the first multiplexer MUX1_1, and the first target voltage NVREG1 may be output from the second multiplexer MUX2_1. In such an embodiment, a circuit may be configured as that shown in FIG. 16, such that the first target voltage NVREG1 may be used as the target voltage, and the first target voltage NVREG1 may be applied to Equation 2 instead of the third reference voltage NELVDD.

In an embodiment, as described above with reference to FIGS. 15 and 16, the second reference voltage corrector 230_4 may select one of the first target voltage NVREG1 (that is, the first target voltage NVREG1 having the noise similar to that of the first reference voltage VREG1 by dividing the first reference voltage VREG1), the second target voltage NVREF1 (that is, the second target voltage NVREF1 having the noise similar to that of the second reference voltage VREF1 by dividing the second reference voltage VREF1), and the third reference voltage NELVDD, and generate the second corrected reference voltage AVC_VREF1 using the selected one (or the set target voltage), the second reference voltage VREF1, and the external power voltage ELVDD_EXT. Therefore, the second corrected reference voltage AVC_VREF1 may be associated with the external power voltage ELVDD_EXT, and the noise of the second reference voltage VREF1 may be removed by the third reference voltage NELVDD, the first target voltage NVREG1, or the second target voltage NVREF1.

In an embodiment, as shown in FIG. 15, when the value of the first sub selection signal AVREF1_IN_SEL1 is "0" and the value of the second sub selection signal AVREF1_IN_SEL2 is "10", the circuit may be configured as that of FIG. 16 (that is, the second reference voltage corrector 230_4), but the disclosure is not limited thereto. In one alternative embodiment, for example, the second reference voltage corrector 230_4 may not include the resistor string RST (or the second resistor string), the decoder DEC (or the second decoder), and the multiplexer MUX2 shown in FIG. 15, and include only the second amplifier AMP2 (or the differential amplifier), the fifth resistor R5, the sixth resistor R6, the seventh resistor R7, and the eighth resistor R8 shown in FIG. 16.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
    a display unit including a pixel which displays an image based on a first power voltage and a data signal;
    a gamma voltage generator which generates a plurality of gamma voltages; and
    a data driver which generates the data signal using the gamma voltages and provides the data signal to the pixel,
    wherein the gamma voltage generator generates a first reference voltage and a second reference voltage, generates a first corrected reference voltage and a second corrected reference voltage by correcting the first reference voltage and the second reference voltage using a target voltage and an external power voltage provided from the display unit in correspondence with the first power voltage, and generates the gamma voltages by dividing the first corrected reference voltage and the second corrected reference voltage, and
    wherein the gamma voltage generator sets the target voltage based on at least one selected from the first reference voltage, the second reference voltage, and a ground voltage.

2. The display device according to claim 1, wherein the gamma voltage generator comprises a first reference voltage corrector which generates a first target voltage by dividing the first reference voltage and the ground voltage and generates the first corrected reference voltage by correcting the first reference voltage in proportion to a voltage difference between the first target voltage and the external power voltage.

3. The display device according to claim 2, wherein the first reference voltage corrector comprises:
    a first resistor string which divides a voltage between the first reference voltage and the ground voltage using a plurality of resistors therein to generate a plurality of voltages; and
    a first decoder which selects and outputs one of the voltages generated by the first resistor string as the first target voltage.

4. The display device according to claim 3, wherein the first reference voltage corrector further comprises:
    a first amplifier which outputs the first corrected reference voltage through an output terminal thereof;
    a first resistor connected between the external power voltage and a first input terminal of the first amplifier;
    a second resistor connected between the first reference voltage and the first input terminal of the first amplifier;
    a third resistor connected between an output terminal of the first decoder and a second input terminal of the first amplifier; and
    a fourth resistor connected between the second input terminal of the first amplifier and the output terminal of the first amplifier.

5. The display device according to claim 2, wherein the gamma voltage generator further comprises a second reference voltage corrector which generates a second target voltage by dividing the second reference voltage and the ground voltage and generates the second corrected reference voltage by adding the second target voltage to a voltage difference between the external power voltage and the second reference voltage.

6. The display device according to claim 5, wherein the second reference voltage corrector comprises:
    a second resistor string which divides a voltage between the second reference voltage and the ground voltage using a plurality of resistors therein to generate a plurality of voltages; and
    a second decoder which selects and outputs one of the voltages generated by the second resistor string as the second target voltage.

7. The display device according to claim 6, wherein the second reference voltage corrector further comprises:
    a second amplifier which outputs the second corrected reference voltage through an output terminal thereof;
    a fifth resistor connected between the external power voltage and a first input terminal of the second amplifier;
    a sixth resistor connected between an output terminal of the second decoder and the first input terminal of the second amplifier;
    a seventh resistor connected between the second reference voltage and a second input terminal of the second amplifier; and
    an eighth resistor connected between the second input terminal of the second amplifier and the output terminal of the second amplifier.

8. The display device according to claim 1, wherein the gamma voltage generator comprises a first reference voltage corrector which sets the ground voltage as a first target voltage and generates the first corrected reference voltage by correcting the first reference voltage in proportion to a voltage difference between the first target voltage and the external power voltage.

9. The display device according to claim 1, wherein the gamma voltage generator comprises a first reference voltage corrector which generates a first target voltage by dividing the first reference voltage and the ground voltage and generates the first corrected reference voltage by correcting the first reference voltage in proportion to a voltage difference between the external power voltage and a selected one of the first target voltage, a third reference voltage and the ground voltage, and
    wherein the third reference voltage is generated together with the first reference voltage and the second reference voltage, and has a voltage level lower than a voltage level of the first reference voltage and higher than a voltage level of the second reference voltage.

10. The display device according to claim 9, wherein the first reference voltage corrector further comprises a multiplexer which selects and outputs one of the first target voltage, the third reference voltage, and the ground voltage based on a first selection signal.

11. The display device according to claim 10, wherein the first reference voltage corrector further comprises:
    a first amplifier which outputs the first corrected reference voltage through an output terminal thereof;
    a first resistor connected between the external power voltage and a first input terminal of the first amplifier;
    a second resistor connected between the first reference voltage and the first input terminal of the first amplifier;
    a third resistor connected between an output terminal of the multiplexer and a second input terminal of the first amplifier; and
    a fourth resistor connected between the second input terminal of the first amplifier and the output terminal of the first amplifier.

12. The display device according to claim 11, wherein the first reference voltage corrector further comprises:

a first resistor string which divides a voltage between the first reference voltage and the ground voltage using a plurality of resistors therein to generate a plurality of voltages; and a first decoder which selects and outputs one of the voltages generated by being divided by the first resistor string as the first target voltage.

13. The display device according to claim 12, wherein the gamma voltage generator further comprises:

a second resistor string which divides a voltage between the second reference voltage and the ground voltage using a plurality of resistors therein to generate a plurality of voltages; and a second decoder which selects and outputs one of the voltages generated by the second resistor string as a second target voltage, and the multiplexer selects and outputs one of the first target voltage, the second target voltage, the third reference voltage, and the ground voltage based on the first selection signal.

14. The display device according to claim 1, wherein the gamma voltage generator comprises a second reference voltage corrector which generates a second target voltage by dividing the second reference voltage and the ground voltage and generates the second corrected reference voltage by correcting the second reference voltage using the external power voltage and a selected one of the second target voltage and a third reference voltage, and wherein the third reference voltage is generated together with the first reference voltage and the second reference voltage, and has a voltage level lower than a voltage level of the first reference voltage and higher than a voltage level of the second reference voltage.

15. The display device according to claim 14, wherein the second reference voltage corrector comprises:

a first multiplexer which selects and outputs one of the second reference voltage and the second target voltage based on a second selection signal; and a second multiplexer which selects and outputs one of the third reference voltage and the second reference voltage based on the second selection signal.

16. The display device according to claim 15, wherein the second reference voltage corrector further comprises:

a second amplifier which outputs the second corrected reference voltage through an output terminal thereof;

a fifth resistor connected between the external power voltage and a first input terminal of the second amplifier;

a sixth resistor connected between an output terminal of the first multiplexer and the first input terminal of the second amplifier;

a seventh resistor connected between an output terminal of the second multiplexer and a second input terminal of the second amplifier; and an eighth resistor connected between the second input terminal of the second amplifier and the output terminal of the second amplifier.

17. The display device according to claim 16, wherein second reference voltage corrector further comprises:

a second resistor string which divides a voltage between the second reference voltage and the ground voltage using a plurality of resistors therein to generate a plurality of voltages; and a second decoder which selects and outputs one of the voltages generated by the second resistor string as the second target voltage.

18. The display device according to claim 15, wherein the gamma voltage generator further comprises:

a first resistor string which divides a voltage between the first reference voltage and the ground voltage using a plurality of resistors therein to generate a plurality of voltages; and a first decoder which selects and outputs one of the voltages generated by the first resistor string as a first target voltage, wherein the second selection signal includes a first sub selection signal and a second sub selection signal, wherein the first multiplexer selects and outputs one of the second reference voltage, the first target voltage, and the second target voltage based on the first sub selection signal, and wherein the second multiplexer selects and outputs one of the third reference voltage and the second reference voltage based on the second sub selection signal.

19. A gamma voltage generation circuit comprising:

a reference voltage generator which generates a first reference voltage and a second reference voltage based on a source voltage;

a first reference voltage corrector which generates a first corrected reference voltage by correcting the first reference voltage using a first target voltage and an external power voltage provided from an outside in correspondence with the first target voltage;

a second reference voltage corrector which generates a second corrected reference voltage by correcting the second reference voltage using a second target voltage and the external power voltage; and a gamma voltage output unit which generates a plurality of gamma voltages by dividing the first and second corrected reference voltages, wherein the first reference voltage corrector sets the first target voltage based on at least one selected from the first reference voltage and a ground voltage.

20. The gamma voltage generation circuit according to claim 19, wherein the first reference voltage corrector generates the first target voltage by dividing the first reference voltage and the ground voltage, and generates the first corrected reference voltage by correcting the first reference voltage in proportion to a voltage difference between the first target voltage and the external power voltage.

21. The gamma voltage generation circuit according to claim 20, wherein the second reference voltage corrector generates the second target voltage by dividing the second reference voltage and the ground voltage, and generates the second corrected reference voltage by adding the second target voltage to a voltage difference between the external power voltage and the second reference voltage.

22. The gamma voltage generation circuit according to claim 19, wherein the first reference voltage corrector sets the ground voltage as a first target voltage, and generates the first corrected reference voltage by correcting the first reference voltage in proportion to a voltage difference between the first target voltage and the external power voltage.

23. The gamma voltage generation circuit according to claim 19, wherein the reference voltage generator further generates a third reference voltage, and wherein the first reference voltage corrector generates the first target voltage by dividing the first reference voltage and the ground voltage, and generates the first corrected reference voltage by correcting the first reference voltage in proportion to a voltage difference between the external power voltage and a selected one of the first target voltage, the third reference voltage, and the ground voltage.

24. The gamma voltage generation circuit according to claim 23, wherein the first reference voltage corrector generates the first corrected reference voltage by correcting the first reference voltage in proportion to a voltage difference between the external power voltage and a selected one of the first target voltage, the second target voltage, the third reference voltage, and the ground voltage.

25. The gamma voltage generation circuit according to claim 19, wherein the reference voltage generator further generates a third reference voltage, and
   wherein the second reference voltage corrector generates the second target voltage by dividing the second reference voltage and the ground voltage, and generates the second corrected reference voltage by correcting the second reference voltage using the external power voltage and a selected one of the second target voltage and the third reference voltage.

26. The gamma voltage generation circuit according to claim 25, wherein the second reference voltage corrector generates the second corrected reference voltage by correcting the second reference voltage using the external power voltage and a selected one of the first target voltage, the second target voltage, and the third reference voltage.

* * * * *